United States Patent
Iizuka et al.

(10) Patent No.: US 6,546,401 B1
(45) Date of Patent: Apr. 8, 2003

(54) METHOD OF RETRIEVING NO WORD SEPARATION TEXT DATA AND A DATA RETRIEVING APPARATUS THEREFOR

(75) Inventors: Yasuki Iizuka, Fujisawa (JP); Tomoko Tanabe, Tokyo (JP); Chuichi Kikuchi, Ichikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 212 days.

(21) Appl. No.: 09/618,055

(22) Filed: Jul. 17, 2000

(30) Foreign Application Priority Data

Jul. 19, 1999 (JP) .......................... 11-204867

(51) Int. Cl.⁷ .................. G06F 15/38; G06F 17/27; G06F 17/21
(52) U.S. Cl. ............... 707/104.1; 707/540; 707/531
(58) Field of Search ............ 707/1, 3, 102–104.1, 707/530, 531, 540; 704/1–10, 530, 531–532

(56) References Cited

U.S. PATENT DOCUMENTS

| | | | | |
|---|---|---|---|---|
| 5,890,103 A | * | 3/1999 | Carus ........................... | 704/9 |
| 6,081,774 A | * | 6/2000 | De Hita et al. .................. | 704/9 |
| 6,212,494 B1 | * | 4/2001 | Boguraev ....................... | 704/9 |

FOREIGN PATENT DOCUMENTS

| JP | 7-56943 | 3/1995 |
|---|---|---|
| JP | 10-307835 | 11/1998 |
| JP | 10-334118 | 12/1998 |

OTHER PUBLICATIONS

"Natural Number–from MathWord", pages :2, printed from http//mathworld.wolfam.com/NaturalNumber.*

"Language Information Processing" by Nagao et al.; Iwanami Shoten, Publishers, 1998; pp. 72–77 (w/partial English translation).

"Statistical Estimation of Word Boundaries Using Normalized Frequency" by Hidekazu Nakawatase; May 28, 1996; pp. 13–18.

* cited by examiner

Primary Examiner—Safet Metjahic
Assistant Examiner—Te Yu Chen
(74) Attorney, Agent, or Firm—Louis Woo

(57) ABSTRACT

Full text data is divided into words to generate word separation data. All character strings are extracted from the full text data, each character string including N characters. The word separation and position data is attached to each character string to generate index data. In word retrieving, character and segmentation agreement between query data and all character strings is checked. Word retrieving and/or character string retrieving are effected according to a selection command. The word separation data may include leading or trailing end data. In the word retrieving mode, the leading end of the first character and the trailing end of the last character are checked but the intermediate portion is not checked. Continuity of retrieve character strings is checked with reference to position data thereof. The word retrieving mode includes a number of modes including the completion agreement mode. A non-target word in retrieving is detected according to a word class and the word separation data is not attached to the non-target word. The word separation data is not attached to words of the affix. Sets of full text data are retrieved and the matching degrees are detected and the sets of full text data are ordered to provide various text agreement. The matching degree is also calculated with an operator.

40 Claims, 22 Drawing Sheets

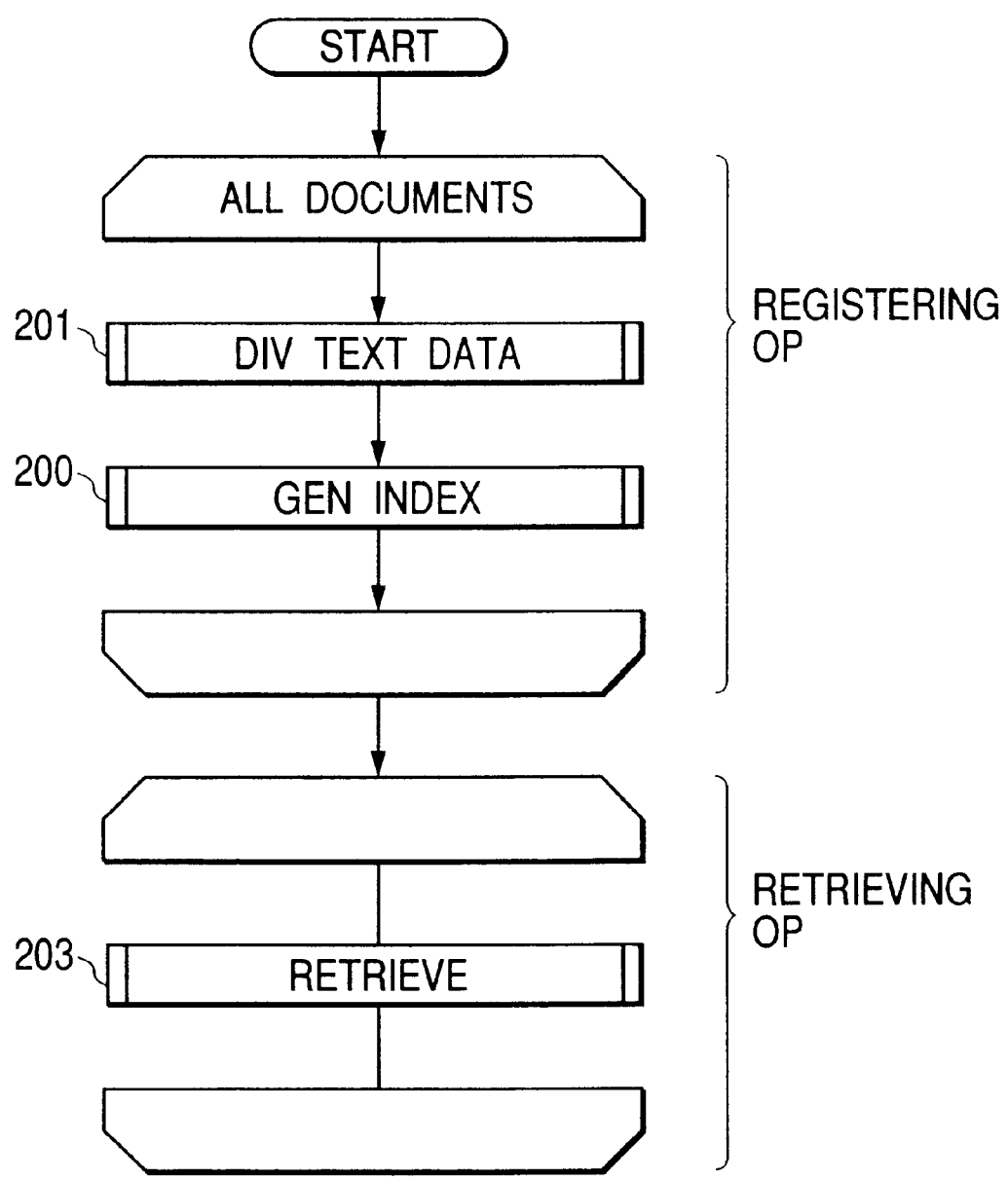

K₁ K₂ K₃ H₁ K₄ K₅ H₂ , (EMBODIMENT OF THIS INVENTION IS ⋯)
THIS INVENTION OF EMBODIMENT IS

↓ WORD SEPARATING

/K₁/K₂ K₃/H₁/K₄ K₅/H₂/ , /

↓ GEN INDEX

| INDEX CHR STORING | DOC# | CHR POS | WORD DATA 1 |
|---|---|---|---|
| K₁ K₂ | 50 | 1 | /K₁/K₂ |
| K₂ K₃ | 50 | 2 | /K₂ K₃/ |
| K₃ H₁ | 50 | 3 | K₃/H₁/ |
| H₁ K₄ | 50 | 4 | /H₁/K₄ |
| K₄ K₅ | 50 | 5 | /K₄ K₅/ |
| K₅ H₂ | 50 | 6 | K₅/H₂/ |
| H₂ , | 50 | 7 | /H₂/ , / |

↓ SORT & STORE

← RETRIEVING

FIG. 5A
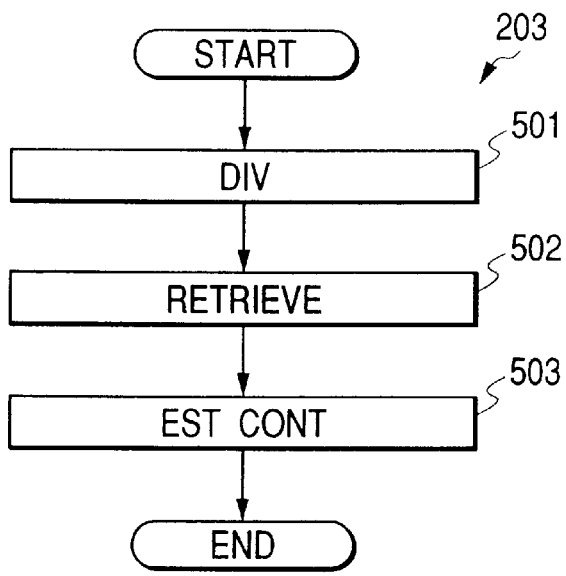
FIG. 5B
K12  K13  K14  K15  K16  K17
P1        P1+2       P1+4
FIG. 5C
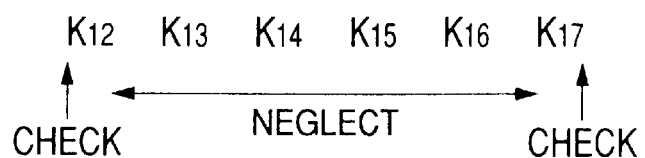

FIG. 6

| MODE | FLG 1 | FLG 3 |
|---|---|---|
| COMPL AGREEMENT | ON | ON |
| FORWARD AGREEMENT INCLUDING COMPL AGREEMENT | ON | NEGLECT |
| BACKWARD AGREEMENT INCLUDING COMPL AGREEMENT | NEGLECT | ON |
| FORWARD AGREEMENT WITHOUT COMPL | ON | OFF |
| BACKWARD AGREEMENT WITHOUT COMPL | OFF | ON |
| INTERMEDIATE AGREEMENT | NEGLECT | NEGLECT |

K₁ K₂ K₃ H₁ K₄ K₅ H₂, (EMBODIMENT OF THIS INVENTION IS ···)
THIS INVENTION OF EMBODIMENT IS

↓ WORD DIVIDING

[K₁][K₂ K₃][H₁][K₄ K₅][H₂][,]

↓ NON-TARGET WORD DEL

[K₁][K₂ K₃] H₁ [K₄ K₅] H₂,

↓ GEN INDEX

| CHR STORING | DOC# | CHR POS | WORD DATA 2 |
|---|---|---|---|
| K₁ K₂ | 50 | 1 | [K₁][K₂ |
| K₂ K₃ | 50 | 2 | [K₂ K₃] |
| K₃ H₁ | 50 | 3 | K₃] H₁ |
| H₁ K₄ | 50 | 4 | H₁ [K₄ |
| K₄ K₅ | 50 | 5 | [K₄ K₅] |
| K₅ H₂ | 50 | 6 | K₅] H₂ |
| H₂ , | 50 | 7 | H₂ , |

↓ SORT & STORE

← RETRIEVING

105 INDEX STORING PORTION

K₁ K₂ K₃ H₁ K₄ K₅ H₂,  (EMBODIMENT OF THIS INVENTION IS ⋯)
THIS INVENTION OF EMBODIMENT IS

↓ WORD DIVIDING

CON
[K₁][K₂ K₃][H₁][K₄ K₅][H₂][,] ← WORD CLASS

↓ NON-TARGET WORD DEL

[K₁][K₂ K₃] H₁ [K₄ K₅] H₂,

↓ GEN INDEX

| CHR STORING | DOC# | CHR POS | WORD DATA 2 |
|---|---|---|---|
| K₁ K₂ | 50 | 1 | [K₁][K₂ |
| K₂ K₃ | 50 | 2 | [K₂ K₃] |
| K₃ H₁ | 50 | 3 | K₃] H₁ |
| H₁ K₄ | 50 | 4 | H₁ [K₄ |
| K₄ K₅ | 50 | 5 | [K₄ K₅] |
| K₅ H₂ | 50 | 6 | K₅] H₂ |
| H₂ , | 50 | 7 | H₂ , |

↓ SORT & STORE

105 INDEX STORING PORTION ← RETRIEVING

K30 K31 K32 H1 K33 K34 K35 H1 K36 K37 K38 H2

[ K30 K31 ] [ K32 ] H1 [ K3 ] [ 3K34 K35 ] H1 [ K36 K37 ] [ K38 ] H2

SUFFIX    PREFIX                              SUFFIX

DOC 1: 「、、東京都は、、東京都の、、東京都の街並みは、、、しかし京都の町は、、、、」   t=4

DOC 2: 「東京都の、、東京都は、、東京都が、、、東京都会、、東京都港区、、
東京都によると、、、、東京都で、、、東京都。」   t=8

DOC 3: 「、、、、京都の景観が、、、、」   t=1

DOC 4: 「、、、いつも京都に来ると、、、、東京都の、、の京都の、、、」   t=3

DOC 5: 「、、東京都議会は、東京都予算の、、、」   t=2

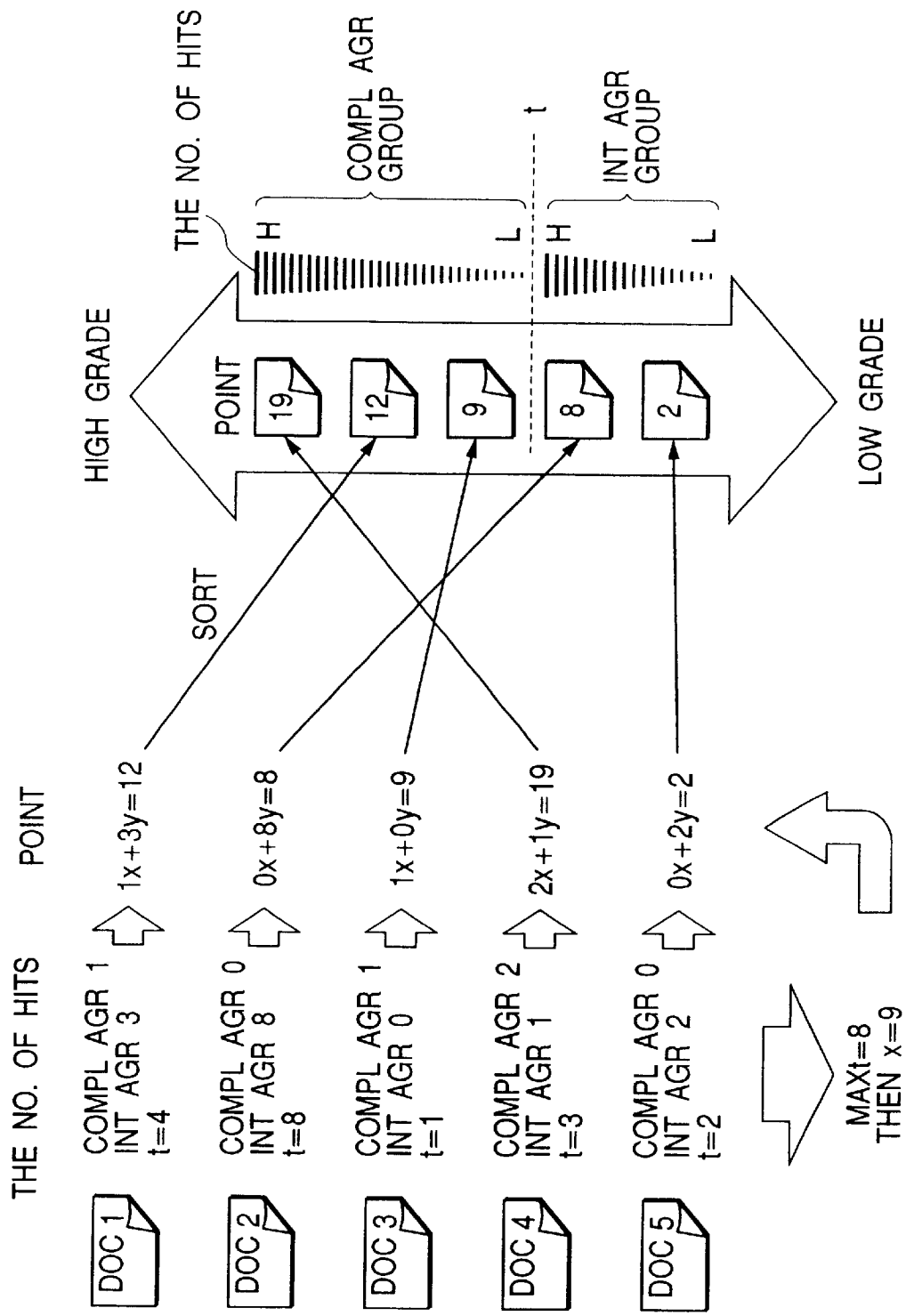

FIG. 21A
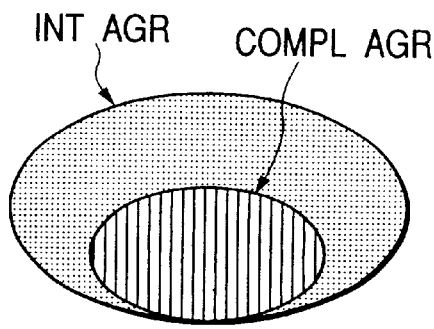
FIG. 21B
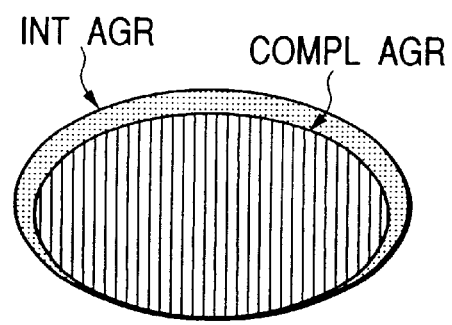
FIG. 22
QUERY DATA 1    OP    QUERY DATA 2
FIG. 23
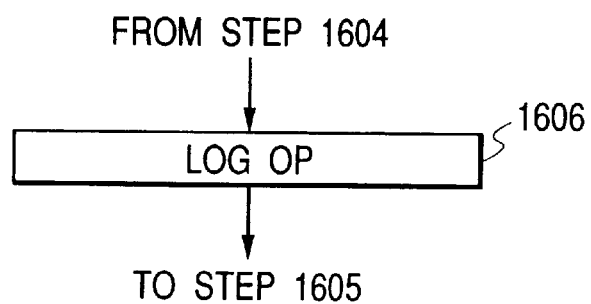

METHOD OF RETRIEVING NO WORD SEPARATION TEXT DATA AND A DATA RETRIEVING APPARATUS THEREFOR

BACKGROUND OF THE INVENTION

1. Field of the Invention

This invention relates to a method of retrieving data and a data retrieving apparatus.

2. Description of the Prior Art

A data retrieving apparatus for retrieving data from full text data is known. A data retrieving apparatus for retrieving data with index data is disclosed in Japanese patent application provisional publication No. 7-56943. In this data retrieving apparatus, special position marks are inserted Just before and Just after a predetermined character string and an index is generated.

SUMMARY OF THE INVENTION

The aim of the present invention is to provide a superior method of retrieving data and a superior data retrieving apparatus.

According to the present invention a first aspect of the present invention provides a method of retrieving first and second candidate data in full text data including no word separation data, comprising the steps of: (a) dividing the full text data into words and thereby generating word separation data; (b) generating and storing index data including the steps of: (c) extracting all character strings from the full text data, each character string including N characters, N being a natural number; and (d) attaching the word separation data and character position data of each of the character strings to each of the character strings to generate the index data; (e) inputting query data with segmentation indicative of leading and trailing ends of the query data; (f) detecting agreement in word retrieving, said (f) including steps of: (g) collating the query data with each of the character strings in the index data to detect character agreement; (h) collating the segmentation of the query data with the word separation data of each of the character strings to detect segmentation agreement; (i) outputting the character position data of one of character strings showing the character agreement and the segmentation agreement; and (j) detecting agreement in character string retrieving, said (j) including steps of: (k) collating the query data with each of the N characters in the index data; and (l) outputting the character position data of one of the character strings showing only the character agreement, wherein either of the step (f) or step (j) is effected in accordance with a selection command and the index data is commonly used in the steps (f) and (j).

Preferably, the step (a) includes a step of: generating the word separation data to have leading and trailing end data of each of the words and in step (h). The segmentation of the query data is compared with the leading and trailing end data of each character string, and in step (i). The position data of the first candidate data is outputted when the segmentation of the query data agrees with the leading and trailing end data of the one character string. Moreover, in this case, the step (a) further includes step of: checking whether a first character having a first order in one of the character strings has leading and trailing ends; attaching the leading end data to one of the character strings with respect to the first character when the first character has the leading end; attaching the trailing end data to one of the character strings with respect to the first character when the first character has the trailing end; checking whether a second character following the first character has a trailing end; attaching the trailing end data to the one of the character strings with respect to the second character when the second character has the trailing end.

Preferably, both the steps (f) and (j) are effected in accordance with the selection command.

Preferably the method further comprise steps of: dividing the query data into query character strings, each query character string includes N query characters, the step (g) being executed for the query character strings to obtain collating results of the query character strings, respectively; estimating continuity of the character strings showing the character agreement with the query character strings in accordance with the position data of the character strings showing the character agreement, the step (h) being executed with respect to the word separation data Just before the first character and the word separation data Just after the last character of the character strings showing the character agreement and the continuity, wherein in step (i) the position data of the first candidate data is outputted when there is the continuity and the word separation data of the first and the last characters of the character strings agrees with the segmentation of the word separation data of the first and the last characters. In this case, the segmentation agreement is detected in either of first to fifth modes in response to a mode command, in the first mode, the segmentation agreement is established when the segmentation of the first and the last characters of the query data agrees with the word separation data Just before the first character and the word separation data Just after the last characters of the character string showing the character agreement; in the second mode, the segmentation agreement is established when the segmentation of the first and the last characters of the query data agrees with the word separation data just before the first character and the word separation data just after the last characters of the character string showing the character agreement and when the segmentation of only the first character of the query data agrees with the word separation data just before the first character of the character string showing the character agreement; in the third mode, the segmentation agreement is established when the segmentation of the first and the last characters of the query data agrees with the word separation data just before the first character and the word separation data just after the last characters of the character string showing the character agreement and when the segmentation of only the last character of the query data agrees with the word separation data just after the last character of the character string showing the character agreement; in the fourth mode, the segmentation agreement is established when the segmentation of only the first character of the query data agrees with the word separation data just before the first character of the character string showing the character agreement; and in the fifth mode, the segmentation agreement is established when the segmentation of only the last character of the query data agrees with the word separation data just before the first character of the character string showing the character agreement.

Preferably, the method further comprise the steps of: detecting a condition of each word in the full text data; and judging whether each word is a non-target word in retrieving in accordance with the condition. In the step (d), the word separation data is not attached to the one character string including the non-target word when one of the words is judged as a non-target word and the segmentation agreement is not effected when the word separation data is not attached to the one character string.

Preferably, the method further comprise the steps of: detecting a condition of each word in the full text data; and judging whether each word is a non-target word in retrieving in accordance with the condition, wherein in the step (d), the leading and trailing end data of the word separation data is not attached to the each character string when one of the words is judged to be a non-target word and the segmentation agreement is not detected when the word separation data is not attached to the one character string.

Preferably, the method further comprise the steps of: detecting a prefix and a suffix of each word in the full text data, wherein the leading end data is not generated as the word separation data when the previous word of one of the words is prefix and the trailing end data is not generated as the word separation data when the following word of one of the words is suffix. In this case, the method further comprise the steps of: detecting a word class of each word in the full text data to detect the prefix and the suffix.

Preferably, a frequency of appearance of each word in the full text is detected, wherein one of words is judged to be the prefix and suffix in accordance with the frequency.

Preferably, the method, further comprise steps of: numerically evaluating the results of the steps of (f) and (j). The first and second candidate data is retrieved in sets of the full text data having document identification data. The method further comprises the steps of: ordering the sets of the full text data in accordance with the results of the steps of (f) and (j) of the sets of the full text data; and outputting the document identification data of the ordered full text data. In this case, the both steps of (f) and (j) are executed, the method further comprising the step of: weighting the results of the steps (f) and (j) with different first and second coefficients, respectively.

In this case, the first and second coefficients are determined such that any set of the full text data having the lowest numerically evaluated result of the step (f) is ranked higher than any set of the full text data having the highest numerically evaluated result of the (j).

In the word retrieving mode, there may be first to fifth modes. The method may further comprise steps of: weighting the results of the step (f) with first to third different coefficients in the first to third modes, respectively numerically evaluating the results of the steps of (f) and (j), wherein the first and second candidate data is retrieved in sets of the full text data having document identification data. The method further comprise the steps of: ordering the sets of the full text data in accordance with the results of the steps of (f) and (j) of the sets of the full text data; and outputting the document identification data of the ordered full text data. In this case, the method further comprises the steps of: inputting ordering commands for ordering the first to third modes; generating the first to third coefficients in accordance with the ordering commands such that one of the first to third coefficients of which mode is the most highly ordered has a highest value, another of the first to third coefficients of which mode is the lowliest ordered has a lowest value, the other of the first to third coefficients of which mode is intermediately ordered has an intermediate value. In this case, the first and second candidate data is successively retrieved in each set of the full text data having document identification data. The method further comprise the steps of: classifying the sets of full text data into first to third groups such that the first group of the full text data includes the candidate data most highly ordered mode, the second group of the full text data includes the candidate data intermediately ordered mode but does not include the candidate data most highly ordered mode, and the third group of the full text data includes the candidate data lowliest ordered mode but does not include the candidate data most highly ordered and intermediately ordered modes; ordering a first portion of the sets of the full text data in each of the first to third groups every the group in accordance with the number of pieces of the first candidate data retrieved in step (f) in respective full text data of the first portion; and ordering a second portion of the sets of the full text data in which only the second candidate data is retrieved in step (j) in accordance with the number pieces of the second candidate data.

The query data may include a plurality of quarry character strings and at least an operator indicating operation among a plurality of query character strings are inputted, wherein in the step of ordering, the each of full text data is ordered in accordance with each of the query character strings, the method further comprising the step of: finally ordering the sets of the full text data in accordance with the ordering result of the sets of the full text data and the operator.

According to the present invention a second aspect of the present invention provides a data retrieving apparatus for retrieving first and second candidate data in full text data including no word separation data, comprising: dividing means for dividing the full text data into words and thereby generating word separation data; generation and storing means for generating and storing index data including: extracting means for extracting all character strings from the full text data, each character string including N characters, N being a natural number; and attaching means for attaching the word separation data and character position data of each of the character strings to each of the character strings to generate the index data; inputting means for inputting query data with segmentation indicative of leading and trailing ends of the query data; first detecting means for detecting agreement in word retrieving including: first collating means for collating the query data with each of the character strings in the index data to detect character agreement; second collating means for collating the segmentation of the query data with the word separation data of each of the character strings to detect segmentation agreement; first outputting means for outputting the character position data of one of character strings showing the character agreement and the segmentation agreement; and second detecting means for detecting agreement in character string retrieving including: third collating means for collating the query data with each of the N characters in the index data; and second outputting means for outputting the character position data of one of the character strings showing only the character agreement, wherein either of the first detecting means or the second detecting means is operated in accordance with a selection command and the index data is commonly used in the first and second detecting means.

BRIEF DESCRIPTION OF THE DRAWINGS

The object and features of the present invention will become more readily apparent from the following detailed description taken in connection with the accompanying drawings in which:

FIG. 2 depicts a flow chart of the first embodiment showing the operation of the data retrieving apparatus;

FIG. 5A depicts a flow chart of the first embodiment showing the retrieving operation;

FIG. 5B is an illustration of the first embodiment showing the position relation;

FIG. 5C is an illustration of the first embodiment showing the segmentation agreement in the completion agreement;

FIG. 6 is a table of the first embodiment showing conditions of retrieving;

FIG. 19 is an illustration of the fourth embodiment showing an example of document for retrieving;

FIG. 20 is an illustration of the fourth embodiment showing the point calculation operation and the ordering operation;

FIGS. 21A and 21B are illustrations of the fourth embodiment showing the relation between the completion agreement and the intermediate agreement;

FIG. 22 is an illustration of the fourth embodiment showing query data and operator; and FIG. 23 depicts a portion of a flow chart of the fourth embodiment.

The same or corresponding elements or parts are designated with like references throughout the drawings.

DETAILED DESCRIPTION OF THE INVENTION

The Japanese language in a written form will be explained briefly hereinafter. In a Japanese sentence of a written form, characters are arranged sequentially but there is no separating space between the words. This written Japanese form is quite different from the written English or German form. Therefore, in order to analyze the semantics or the meaning of a Japanese sentence, it is necessary to recognize words and then rewrite the sentence in a word-separate form where the recognized words are expressed in a separate manner. The process of recognizing words has a step of separating characters into groups corresponding to respective words. Japanese characters include "hiraganas", "katakanas", "romajis", and "kanjis" whose singular forms are written as "a hiragana", "a katakana", "a romaji", and "a kanji", respectively. "Hiraganas", "katakanas", and "romajis" are phonetic symbols. "Romajis" enable a method of writing Japanese in Roman characters. "Kanjis" are ideographic characters. General Japanese sentences include a mixture of "hiraganas" and "kanjis". Some Japanese sentences include "katakanas" and "romajis" in addition to "hiraganas" and "kanjis". In the Japanese language, there are no standard rules that determine what type of a word should be written in "hiraganas" or "kanjis". Accordingly, a word is written in "hiraganas" in some cases and is written in "a kanji or kanjis" in other cases.

In this specification, "a kanji" is expressed by "K" with suffix number, for example "$K_1$" and "a hiragana" is expressed by "H" with suffix number, for example "$H_1$". Moreover, "kanjis" may be expressed on a waveform line, "kanjis" on the same waveform line (e.g., $K_1K_2$) expresses one word.

FIRST EMBODIMENT

Figure 1A:
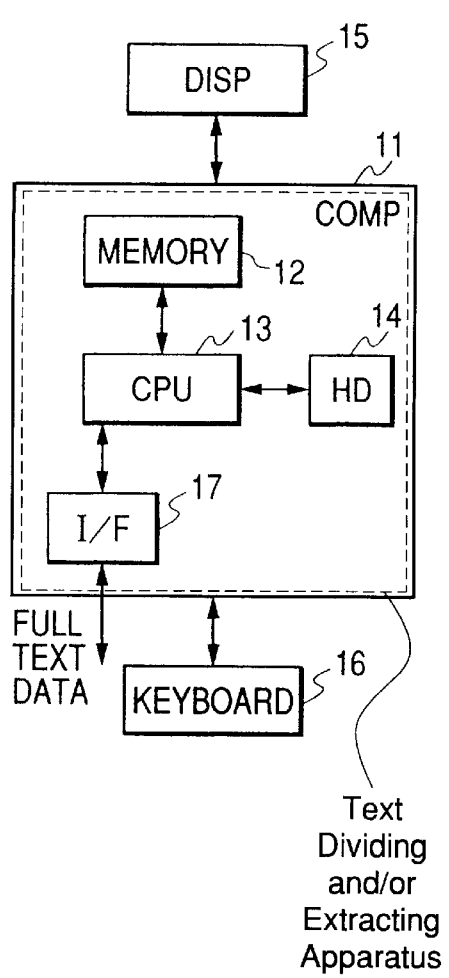
FIG. 1A is a block diagram of a data retrieving apparatus according to a first embodiment.

FIG. 1A is a block diagram of a data retrieving apparatus according to a first embodiment.

The data retrieving apparatus includes a computer unit 11, a display 15, and a keyboard 16. The computer unit 11 includes a memory 12 including a ROM and a RAM, a cpu 13, a hard disc unit 14, and an interface 17. An operator operates the keyboard 16 registers one set or sets of full text from a floppy disc, an optical disc, or a network (not shown) through the interface 17. In response to a registration command from the keyboard 16, the computer unit 11 registers the full text data in the hard disc unit 14 and the result is displayed on the display 15.

When the operator inputs a retrieving command with query data with the keyboard 16, the computer unit 11 searches and retrieves the candidate data and the result is displayed on the display 15.

Figure 1B:
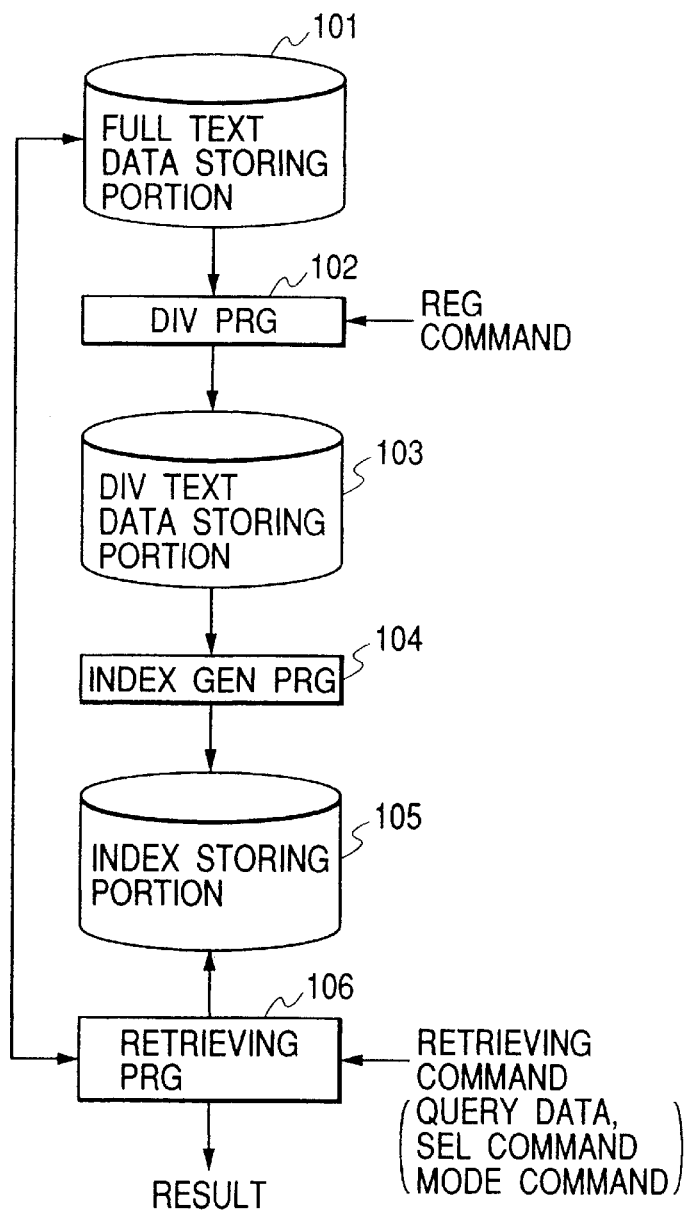
FIG. 1B is a functional block diagram of the data retrieving apparatus of the first embodiment.

FIG. 1B is a functional block diagram of the data retrieving apparatus of the first embodiment. FIG. 2 depicts a flow chart of the first embodiment showing the operation of the data retrieving apparatus.

At least a set of full text data is stored in the full text data storing portion 101 which is provided by the hard disc unit 14. The full text data is stored through the interface 17, wherein each set of full text data is assigned with unique document identification data, namely, document number. The cpu 13 divides the full text data with a separating program 102 in response to a registering command inputted from the keyboard 16 by an operator to provide full text data including separating space data (word separation data) between words in step 201. The cpu 13 stores the divided text in a divided text data storing portion 103 which is provided by the hard disc unit 14. The cpu 13 generates index data with an index generation program 104 in step 202. The cpu 13 stores the index in an index storing portion 105.

In retrieving operation, there is a word retrieving mode, a character string retrieving mode, and a combined mode which are selected in accordance with a selection command.

When the operator desires to retrieve candidate data in the word retrieving mode, the operator inputs a character string for retrieving (retrieving condition) as query data with the retrieving command, the selection command, and a mode command.

In response to the retrieving command and query data, the selection command, and the mode command, the cpu 13 retrieves candidate data corresponding to query data with reference to the index data in the index storing portion 105 to detect the document numbers and the positions of the candidate data in the full text data using the retrieving program 106.

Next, the cpu 13 displays the retrieving result on the display 15. That is, the cpu 13 displays the document numbers, the position of the retrieved character string in the document and reads the portion of the full text data retrieved on the display 15.

The text data is divided into words which are separated with word separation data through the well-known morphological analysis or the statistic method. However, there are various word separating methods used for this embodiment and thus, the other methods of separating the text data into words can be used in this embodiment. Moreover, it is also possible to actually divide the full text data but words and the boundaries should be recognized.

Figure 3A:
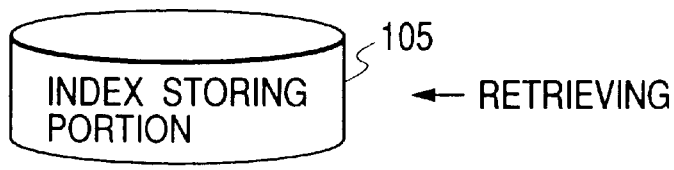
FIGS. 3A and 3B depict illustrations of the first embodiment showing the operation of generating the index.
Figure 3B:
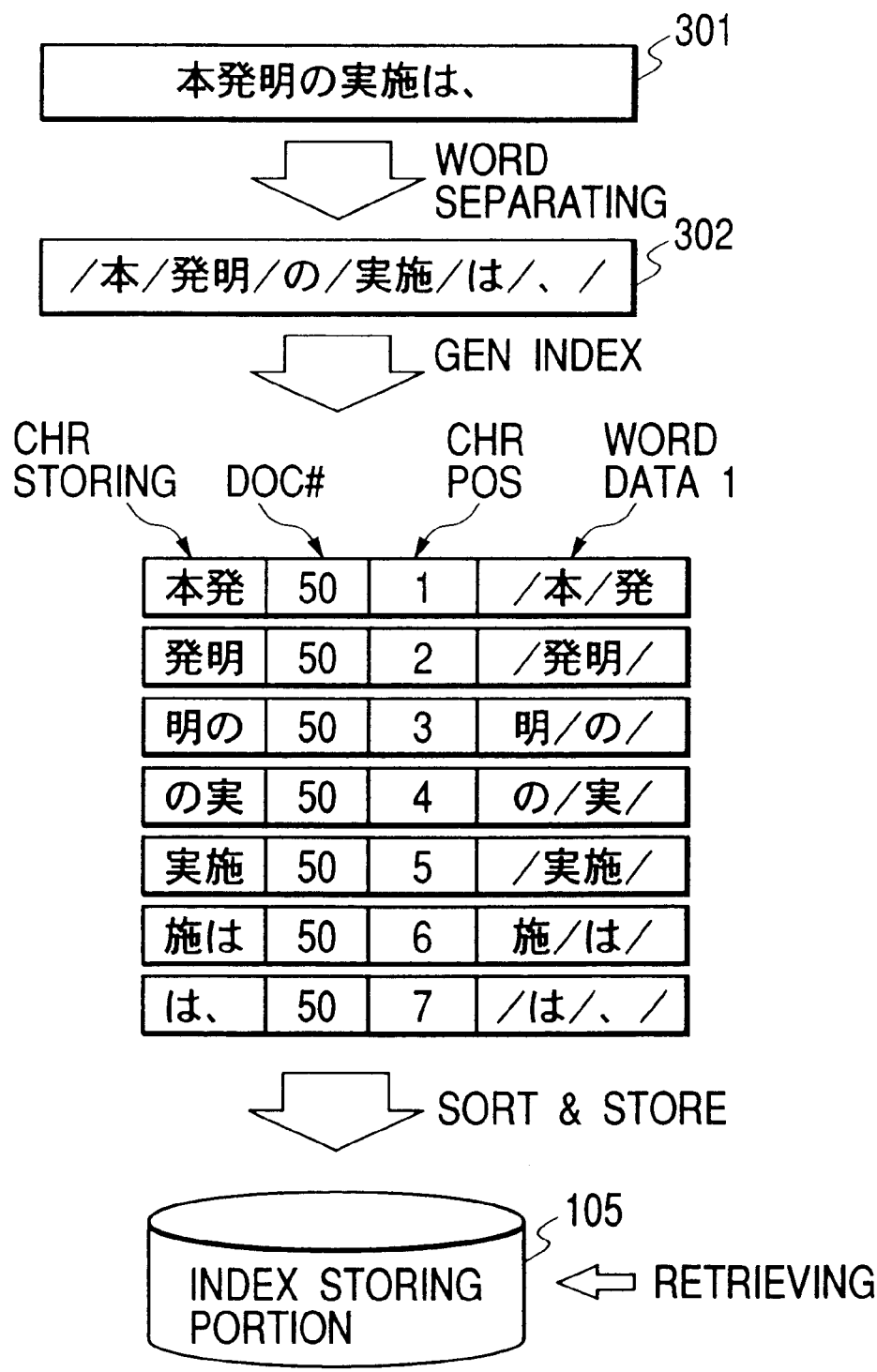

FIGS. 3A and 3B depicts illustrations of the first embodiment showing the operation of generating the index. In FIG. 3A, characters represented in the text data with alphabetic symbols with suffixes. In FIG. 3B, the same operation is expressed but characters are expressed in Japanese. Moreover, in FIG. 3A, characters on the same wave line represents one word, wherein wave lines are only provided for indicating word boundary for convenience and thus there is no-data of wave line in the data. "K" represents "a kanji" and "H" represents "hiragana. The meaning is expressed in parentheses.

In FIGS. 3A and 3B, a character string, $K_1$ $K_2$ $K_3$ $H_1$ $K_4$ $K_5$ $H_2$, (EMBODIMENT OF THIS INVENTION IS . . . ) is divided into words as follows:

$K_1/K_2$ $K_3/H_1/K_4$ $K_5/H_2/,/$

The cpu 13 extracts all index character strings 31 from the full text data, wherein each of index character string 31 includes n characters. N is a natural number. In this embodiment, the operation is described assuming that N is 2. More specifically, two characters are extracted from the beginning of the full text data with the top characters in each index character string backwardly shifted by one character. In other words, each index character string includes each character of the full text data and the following character of which the number is N−1.

Accordingly, the first index character string includes characters $K_1K_2$ and the second to seventh index character strings include characters $K_2K_3$, $K_3H_1$, $H_1K_4$, $K_4K_5$, $K_5H_2$, $H_2$. Each index character string is sorted with a predetermined order and stored with the document number data and the character position data, and word data 1 representing word boundary of the index character strings. In fact, the word data 1 is converted into flags FLG1–3.

Figure 4A:
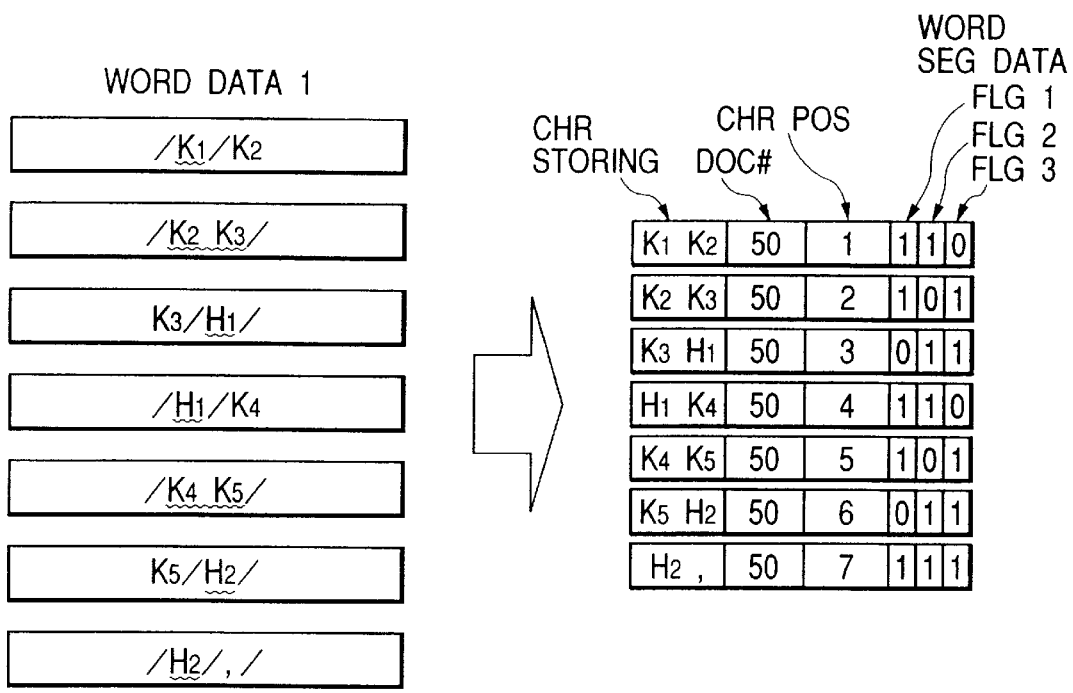
FIGS. 4A and 4B are illustrations of the first embodiment.
Figure 4B:
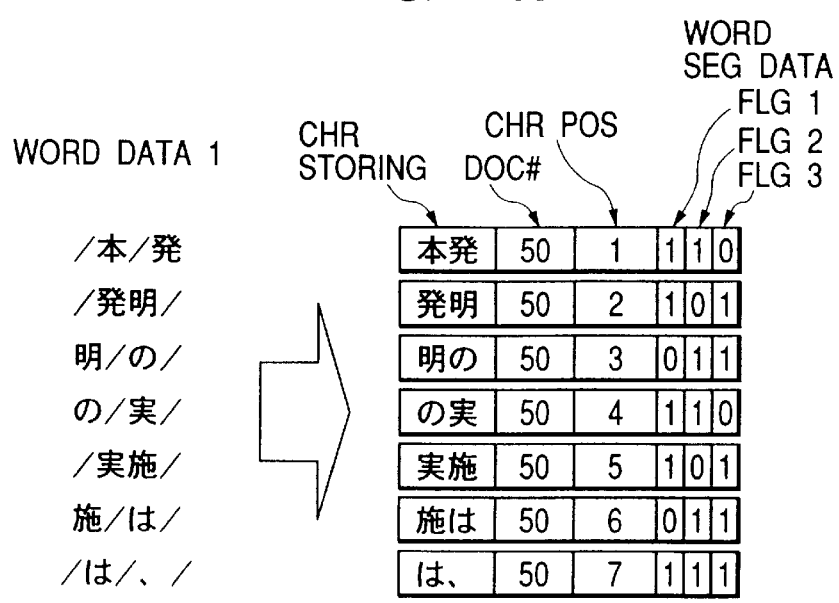

FIGS. 4A and 4B are illustration of the first embodiment. FIG. 4B shows the illustration in FIG. 4A with the character in Japanese.

The flag FLG1 represents that there is word segmentation before the first character in the index character string when the flag FLG1 is ON. The flag FLG2 represents that there is word segmentation after the first character in the index character string when the flag FLG2 is ON. The flag FLG3 represents that there is word segmentation after the second character in the index character string when the flag FLG2 is ON. For example, in the first index character string, there is word segmentation before and after character $K_1$ and there is no word segmentation after character $K_2$, so that the flags FLG1–FLG3 are expressed 1,1,0 (ON, ON, OFF).

As mentioned, the index data including index character strings, the document number data, character position data, and the flags representing the word segmentation is provided. Each of index character strings is stored with the document number data, the character position data and the flags of each index character string, wherein each word segmentation is represented by one bit data, so that the size of the index can be reduced.

FIG. 5A depicts a flow chart of the first embodiment showing the retrieving operation.

Retrieving operation (step 203) will be described.

The cpu 13 executes the retrieving program 106 in response to the retrieving command in the character string retrieving mode and/or the word retrieving mode which are selected in accordance with the selection command. The index data is commonly used in the character string retrieving mode, the word retrieving mode, and the combined mode.

In the word retrieving mode, the cpu 13 detects segmentation agreement in addition to the character agreement.

In the word retrieving mode, there are first to fifth modes, namely, the mode for detecting completion agreement, the mode for detecting forward agreement including the completion agreement, the mode for detecting backward agreement including the completion agreement, the mode for detecting forward agreement not including the completion agreement, and the mode for detecting backward agreement not including the completion agreement.

More specifically, in the first mode, the segmentation agreement is established when the segmentation of the first and the last characters of the query data agrees with the word separation data of the first and the last characters of the index character strings showing the character agreement.

In the second mode, completion agreement is detected. More specifically, in the second mode, the segmentation agreement is established when the segmentation of the first and the last characters of the query data agrees with the word separation data just before the first character and the word separation data just after the last characters of the character string showing the character agreement and when the segmentation of only the first character of the query data agrees with the word separation data of the first character of the character string showing the character agreement.

In the third mode, the segmentation agreement is established when the segmentation of the first and the last characters of the query data agrees with the word separation data of the first and the last characters of the character string showing the character agreement and when the segmentation of only the last character of the query data agrees with the word separating data of the last character of the character string showing the character agreement.

In the fourth mode, the segmentation agreement is established when the segmentation of only the first character of the query data agrees with the word separating data of the first character of the character string showing the character agreement; and In the fifth mode, the segmentation agreement is established when the segmentation of only the last character of the query data agrees with the word separating data of the first character of the character string showing the character agreement.

In step 501, the cpu 13 receives the query data including query characters from the keyboard 16 and divides the query data to provide query character strings, each including N characters as similar as the index character strings and detects what position of each divided characters is from the beginning of the query character strings. The cpu 13 stores the positions of each query character strings. The divided character strings is also referred to as partial query character strings.

For example, the query data including "$K_6K_7K_8K_9K_{10}K_{11}$" is divided into three query strings, "$K_6K_7$", "$K_8K_9$", and "$K_{10}K_{11}$" and the positions are the zeroth, second, and fourth positions.

If the query data cannot be divided by N, a portion of the characters is overlapped. For example, if the query data includes "$K_{12}K_{13}K_{14}K_{15}K_{16}$", the divided query character strings are "$K_{12}K_{13}$", "$K_{14}K_{15}$", and "$K_{15}K_{16}$". That is, the character $K_{15}$ in the second query character string is repeatedly used in the third query character strings. In this case, the position of query character strings are zeroth, second, and third positions, respectively.

In step 502, the cpu 13 collates each of query character strings with the index data to detect character agreement between each query character strings with index character strings and the position of the index character strings showing the character agreement. For retrieving a target character strings from a large amount of index, various well-known method can be used.

Further, segmentation agreement is checked. The first query character string "$K_{12}K_{13}$" has segmentation before the first character $K_{12}$ naturally because in inputting the query data, there is no character before the first character. Similarly, the last query character string "$K_{L1}K_{L2}$", in this case, "$K_{15}K_{16}$" has segmentation thereafter. Thus, the cpu 13 checks whether the flag FLG1 of the first character of the character string showing the character agreement with the first query character sting "$K_{12}K_{13}$". If the flag FLG1 is OFF, the cpu 13 judges that this character string showing the character agreement does not show the segmentation agreement. If the flag FLG1 is ON, the cpu 13 judges that this character string shows the character agreement and the segmentation agreement. Similarly, the cpu 13 checks whether the flag FLG3 of the last character of the character string showing the character agreement with the last query character sting "$K_{15}K_{16}$". If the flag FLG3 is OFF, the cpu 13 judges that this character string showing the character agreement does not show the segmentation agreement. If the flag FLG3 is ON, the cpu 13 judges that this character string shows the character agreement and the segmentation agreement. For the intermediate character strings "$K_{14}K_{15}$", the segmentation agreement is not checked but only character agreement is checked. As mentioned, the cpu 13 obtains candidate character strings.

In step 503, the cpu 13 evaluates the candidate character strings by checking the position of the candidate character strings in accordance with said position data of the candidate character strings. For example, it is assumed that character stings "$K_{12}K_{13}$", "$K_{14}K_{16}$", and "$K_{15}K_{16}$" is obtained as the candidate character strings and the character position of the character string "$K_{12}$".

FIG. 5B is an illustration of the first embodiment showing the position relation.

Next the cpu 13 checks whether the document numbers of these candidate character strings are the same and the character position of characters "$K_{14}$" and "$K_{15}$" are P1+2 and P1+4, respectively. If the document numbers of these candidate character strings are the same and the character position of characters "$K_{14}$" and "$K_{15}$" are P1+2 and P1+4, respectively, the cpu 13 judges that there is continuity among the character strings "$K_{12}K_{13}$", "$K_{14}K_{15}$", and "$K_{15}K_{16}$" and finally judges that the character string corresponding to the query data "$K_{12}K_{13}K_{14}K_{15}K_{16}$" is included in the full text data of the document having the document number D1. The cpu 13 displays the character position of the character string of which continuity has been judged and its document number D1.

As mentioned above, the completion agreement is detected and the result is outputted.

FIG. 5C is an illustration of the first embodiment showing the segmentation agreement in the completion agreement. In the completion agreement, the segmentation data just before the first character and the segmentation data just after the last character of the character string showing the character agreement agree with the query data and segmentation of the intermediate characters are not checks. If there is segmentation just before the first character and segmentation just after the last character of the character strings showing the character agreement (intermediate agreement).

FIG. 6 is a table of the first embodiment showing conditions of retrieving.

In FIG. 6, in the first mode (completion agreement mode), the cpu 13 checks that the flag FLG1 of the first character of the character string showing the character agreement is ON and the flag FLG3 of the second character of the character string showing the character agreement is ON to detect the completion agreement.

In the second mode, to detect forward agreement including the completion agreement, the cpu 13 checks that the flag FLG1 of the first character of the character string showing the character agreement is ON but the cpu 13 neglects the flag FLG3 of the second character of the character string showing the character agreement.

In the third mode, to detect backward agreement including the completion agreement, the cpu 13 neglects the flag FLG1 of the first character of the character string showing the character agreement but the cpu 13 checks that the flag FLG3 of the second character of the character string showing the character agreement is ON.

In the fourth mode, to detect forward agreement without the completion agreement, the cpu 13 checks that the flag FLG1 of the first character of the character string showing the character agreement is ON and checks that the flag FLG3 of the second character of the character string showing the character agreement is OFF.

In the fifth mode, to detect backward agreement without the completion agreement, the cpu 13 checks that the flag FLG1 of the first character of the character string showing the character agreement is OFF and checks that the flag FLG3 of the second character of the character string showing the character agreement is ON.

In detecting the intermediate agreement, the cpu 13 neglects flag FLG1 of the first character of the character string showing the character agreement is OFF and the flag FLG3 of the second character of the character string showing the character agreement.

As mentioned, in the word retrieving, the segmentation of character strings is detected in addition to the detection of character agreement, so that noise in retrieving, that is, detection of character strings which are does not actually correspond to the query data is suppressed.

In the character string retrieving mode, the cpu 13 detects (1) intermediate agreement (character agreement). The character agreement is effected by the well-known method, wherein the word segmentation is not examined.

More specifically, in step 501, the cpu 13 receives the query data including character strings from the keyboard 16 and divides the character strings to provide query character strings, each including N characters as similar as the index character strings and detects what position of each divided characters from the beginning of the query character strings and stores the position. The divided character strings is also referred to as partial query character strings.

For example, the query data including "$K_6K_7K_8K_9K_{10}K_{11}$" is divided into three query strings, "$K_6K_7$", "$K_8K_9$", and "$K_{10}K_{11}$" and the positions are the zeroth, second, and fourth positions. If the query data cannot be divided by N, a portion of the characters is overlapped. For example, if the query data includes "$K_{12}K_{13}K_{14}K_{15}K_{16}$", the divided query character strings are "$K_{12}K_{13}$", "$K_{14}K_{15}$", and "$K_{15}K_{16}$". That is, the character $K_{15}$ in the second query character string is repeatedly used in the third query character strings. In this case, the position of query character strings are zeroth, second, and third positions, respectively.

In step 502, the cpu 13 collates each of query character strings with the index data to detect character agreement between each query character strings with index character strings and the position of the index character strings showing the character agreement. For retrieving a target character strings from a large amount of index, various well-known method can be used.

In step 503, the cpu 13 evaluates the candidate character strings by checking the position of the candidate character strings in accordance with said position data of the candidate character strings. For example, it is assumed that character strings "$K_{12}K_{13}$", "$K_{14}K_{15}$", and "$K_{15}K_{16}$" is obtained as the candidate character strings and the character position of the character stings "$K_{12}$" is P1. The cpu 13 checks whether the document numbers of these candidate character strings are the same and the character position of characters "$K_{14}$" and "$K_{15}$" are P1+2 and P1+4, respectively. If the document numbers of these candidate character strings are the same D1 and the character position of characters "$K_{14}$" and "$K_{15}$" are P1+2 and P1+4, respectively, the cpu 13 judges that there is continuity among the character strings "$K_{12}K_{13}$", "$K_{14}K_{15}$", and "$K_{15}K_{16}$" and finally judges that the character string corresponding to the query data "$K_{12}K_{13}K_{14}K_{15}K_{16}$" is included in the full text data of the document having the document number D1. The cpu 13 displays the character position of the character string of which continuity has been judged and its document number D1 as candidate data and also displays the searched portion of the full text data as candidate data.

In the combined mode, the cpu 13 executes the word retrieving operation and the character sting retrieving operation and displays the both results.

If the number of characters in the query data is equal to or less than N, the continuity is not judged.

As mentioned, in this data retrieving apparatus, the cpu 13 divides the full text data into words, thereby generates the word separating data with the separating program 102 and generates the index data including flags FLG1-FLG3 indicative of segmentation of words with the index generation program 104. Further, the cpu 13 effects retrieving with the retrieving program 106 in the character string retrieving mode, the word retrieving mode, and the combined mode in accordance with the mode selection command, wherein the index data is commonly used among the character string retrieving mode, the word retrieving mode, and the combined mode.

In this embodiment, the word retrieving and the character retrieving is provided with one unit, so that selecting one of the retrieving modes from the word retrieving mode, the character string retrieving mode and the combined mode provides a favorable retrieving result. More specifically, in the word retrieving mode, the retrieving condition, that is, segmentation agreement is added to the character string agreement, so that retrieving result is provided with noiseless. On the other hand, the character string retrieving mode can be selected, so that likelihood candidate character strings are detected. Moreover, in the word retrieving mode, in addition to the completion agreement, various retrieving modes having more unstrict condition, for example, the forward agreement are provided, so that the likelihood candidate character string near the completion agreement can be detected.

The word segmentation data indicating the segmentation of words is represented by bits and the index is commonly used in the word retrieving and the character retrieving, so that the size of the index can be reduced.

SECOND EMBODIMENT

The data retrieving apparatus according to a second embodiment has substantially the same structure as the first embodiment. The difference is that a non-target word deleting program 107 is further provided. The cpu 13 executes the non-target word deleting program 107 in the registering operation.

Figure 7A:
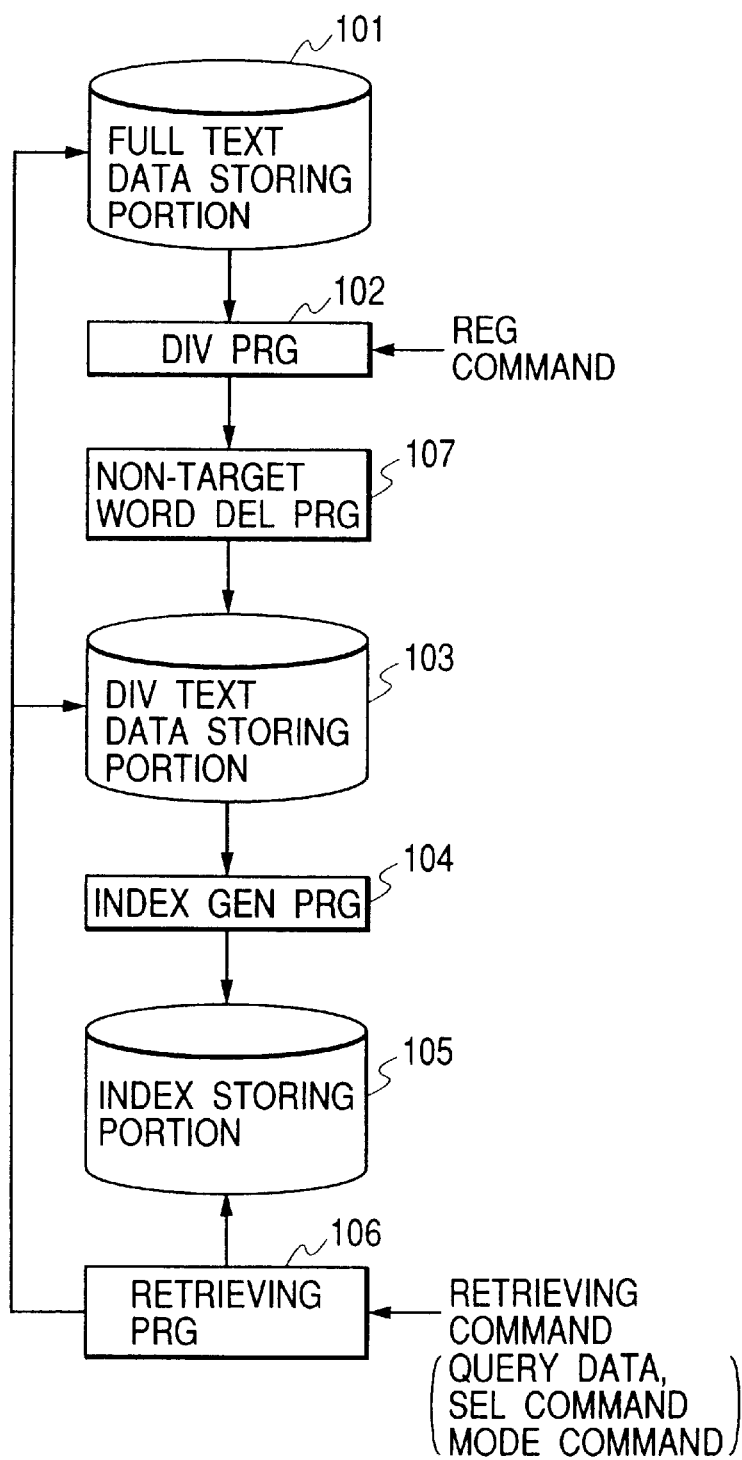
FIG. 7A is a functional block diagram of the data retrieving apparatus of a second embodiment.
Figure 8:
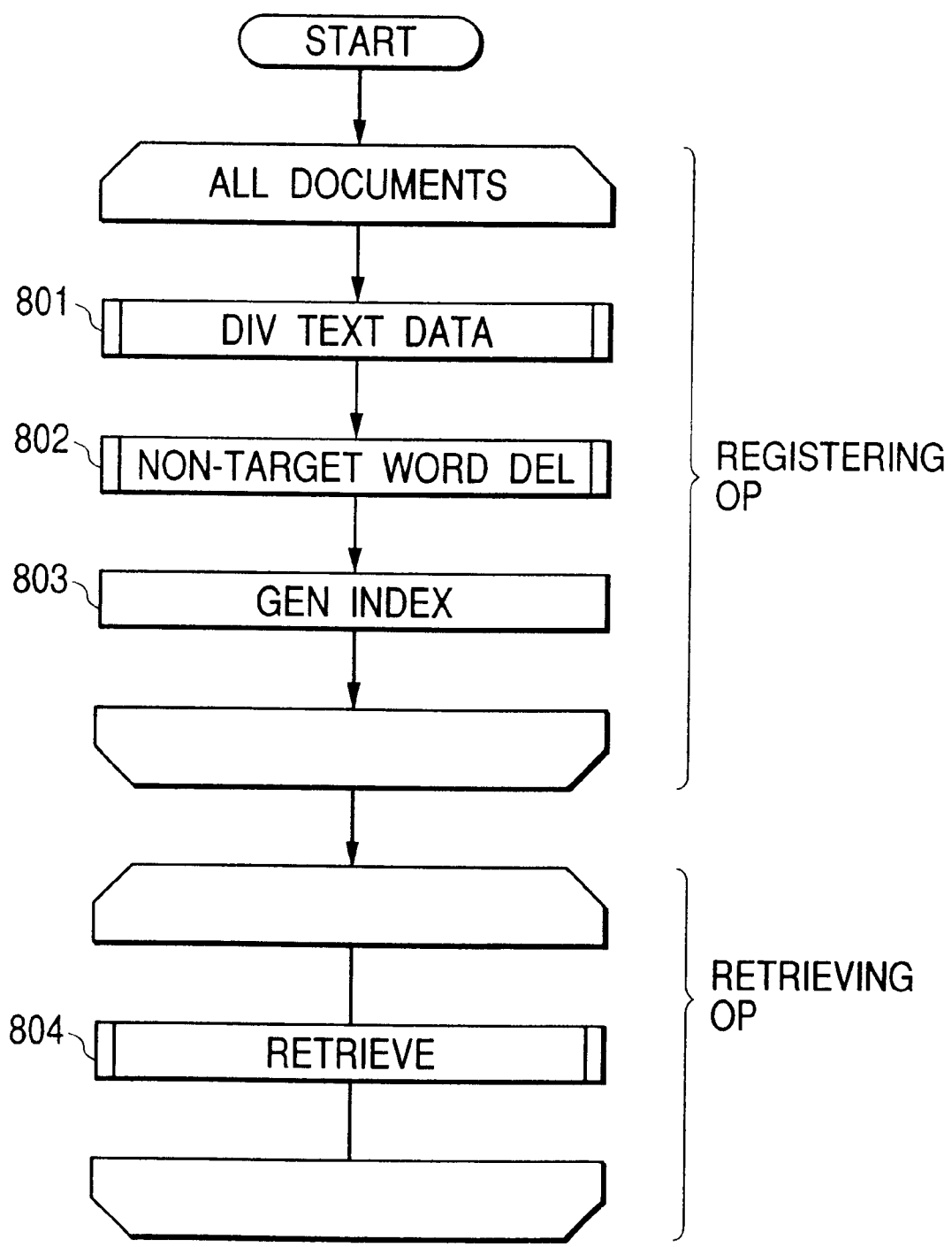
FIG. 8 depicts a flow chart of the second embodiment showing the operation of the data retrieving apparatus.

FIG. 7A is a functional block diagram of the data retrieving apparatus of the second embodiment. FIG. 8 depicts a flow chart of the second embodiment showing the operation of the data retrieving apparatus.

Figure 9A:
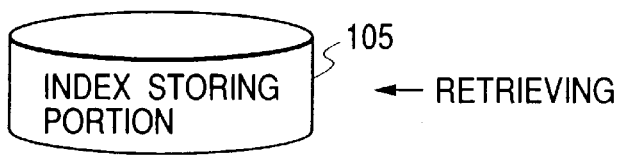
FIGS. 9A and 9B are illustrations of the second embodiment showing the index generation operation.
Figure 9B:
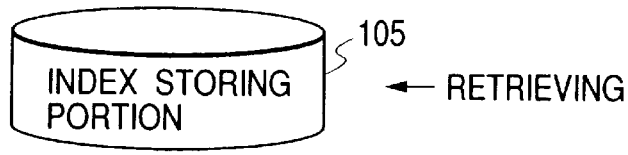

FIGS. 9A and 9B are illustrations of the second embodiment showing the index generation operation.

In FIG. 7A, the cpu 13 executes the non-target word deletion program 107 after executing the separation program 102. In FIG. 8, the cpu 13 effects the non-target word deletion operation 802 after the dividing text data operation 801. The cpu 13 detects the word boundary and divides the full text data and generates the space data (word separation data) with indication of leading and trailing ends of each word. In FIG. 9A, the character "$K_1$" is divided and leading end data and trailing end data is attached to the character "$K_1$". The marks "[" and "]" may be actually used in the text data in the original meaning, so that other data such as special codes which are not used in the full text data may be used.

The non-target data is defined as the word not to be retrieved. This judgment is provided by comparing each word with the well-known non-target word dictionary including non-target words not to be retrieved.

Figure 7B:
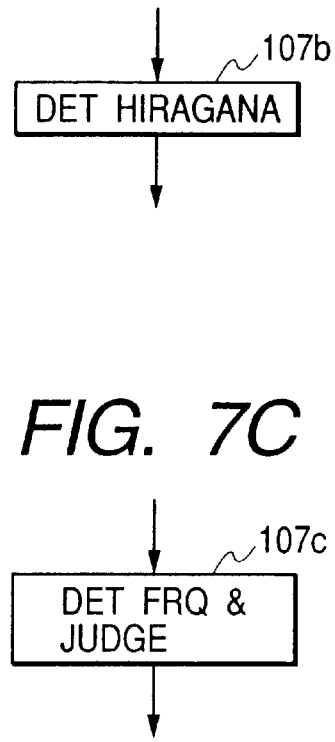
FIGS. 7B to 7D depicts steps of the second embodiment for detecting the non-target words.
Figure 7C:
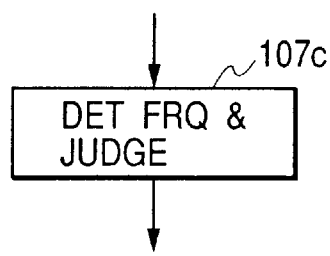
Figure 7D:

FIGS. 7B to 7D depict steps of the second embodiment for detecting the non-target words.

In FIG. 7D, a word class of each word is detected by the word class detecting step 107d which is included in the non-target word deletion program 107. The cpu 13 judges that the word is the non-target word when the word class is one of special word class, for example, a postpositional word functioning as an auxiliary to a main word, an auxiliary verve, a conjunction, marks, etc., which are commonly used in text data and are generally not retrieved.

If the text data is divided into words by statistic method, the word class data is not obtained. Thus, the non-target data is determined when the word includes one "hiragana" or two "hiraganas" by "hiraganas" detecting step 107b. Moreover, appearance frequencies words are detected and the words indicating that the appearance frequencies are higher than a predetermined value are judged to be non-target data by a detecting frequency and judging step 107c.

In FIGS. 9A, "$H_1$", "$H_2$", ",", are judged as the non-target data. Thus, leading and end data before and after the words "$H_1$", "$H_2$", "," is deleted. The word data 2 indicates the index character strings including word or a portion of word and the leading and trailing end data. There may be various ways to attaching the segmentation data to the index character strings but in this embodiment, flags indicating the segmentation is used.

Figure 10:
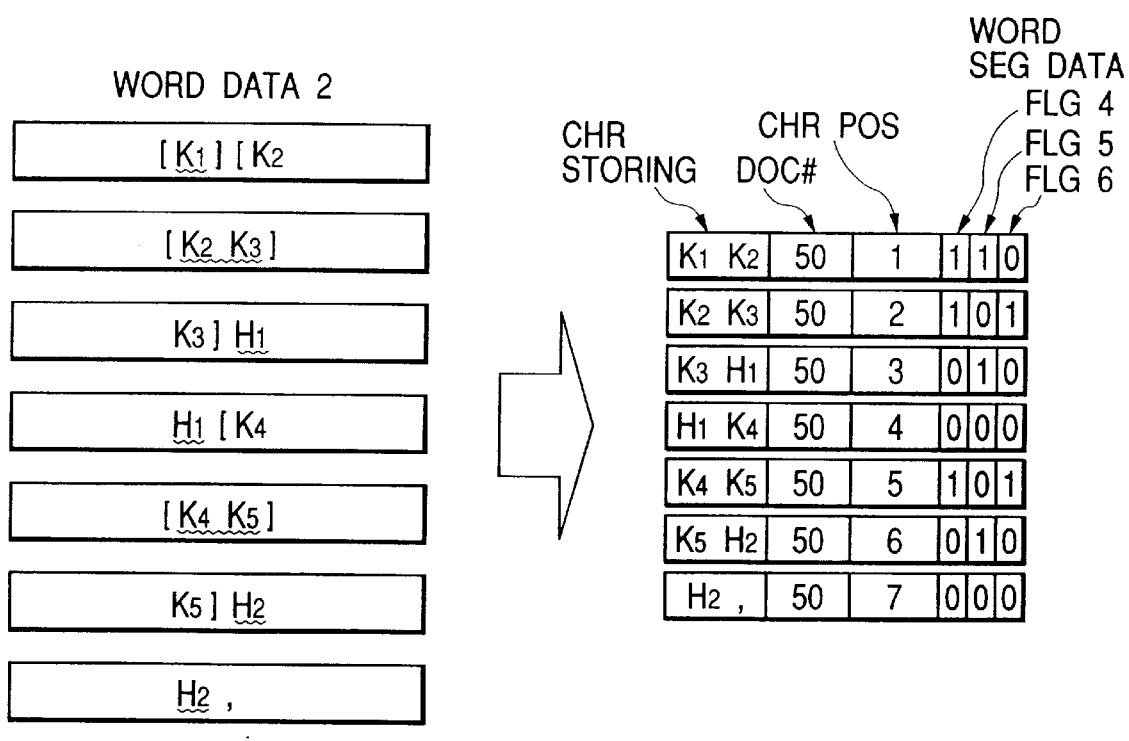
FIG. 10 is an illustration of the second embodiment showing the non-target data processing operation.

FIG. 10 is an illustration of the second embodiment showing the non-target data processing operation.

The cpu 13 generates word segmentation data including flags FLG4–FLG6 in accordance with the word data 2 in step 802. The flag FLG4 is ON when the first character of the index character string has a leading end of the word. The flag FLG5 is ON when the first character of the index character string has a trailing end of the word. The flag FLG6 is ON when the second (last) character of the index character string has a trailing end of the word. Next, the cpu 13 attaches the segmentation data to each index character string to generate the index data in step 803. Each of the flags FLG4–FLG6 is represented by one bit, so that the size of the index data can be reduced. The segmentation of the second character in each index character strings is reduced, that is, the leading end of the second character is neglected, so that the size of the index data can be reduced without affection to the retrieving speed.

Steps 801 to 803 are repeatedly executed for all full text data for registering.

In step 804 of the retrieving operation, the cpu 13 judges the character agreement and segmentation agreement. In segmentation agreement, the cpu 13 checks whether segmentation of the index character string agrees with that of the query data.

The non-target data has no leading and trailing end data, so that the non-target data is not retrieved in the word retrieving mode. Thus, noise in retrieving can be reduced. On the other hand, in the character string retrieving (intermediate agreement) mode, it is possible to hit (retrieve) the non-target data, so that leakage in retrieving can be eliminated.

Moreover, if the query data includes a non-target word sandwiched between word, the word retrieving according to this embodiment provides an accurate retrieving.

If the query data includes "$K_1$ $K_2$ $K_3$ $H_1$ $K_4$ $K_5$", all characters are checked in detecting character agreement. On the other hand, the segmentation checking is effected for the first character and the last character. Thus, the non-target word "$H_1$" is checked in detecting character agreement but the segmentation is not detected with respect to the non-target word "$H_1$". Thus, though the size of the index data is reduced, the word retrieving is effected accurately. Moreover, if query data only includes the non-target data, in the word retrieving, no character string is retrieved, so that noise in retrieving is reduced.

For example, if query data is "$K_{20}K_{21}H_1K_{22}$" (a town of KYOTO), in the character string retrieving mode, "$K_{18}K_{19}K_{20}K_{21}H_1K_{22}K_{23}K_{24}$" (MACHIDA-SHI in TOKYO) is also retrieved. However, in the word retrieving mode, character string of "$K_{20}K_{21}H_1K_{22}$" is accurately hit and noise "$K_{18}K_{19}K_{20}K_{21}H_{22}K_{23}K_{24}$" can be suppressed.

In this embodiment, the cpu 13 detects the non-target data and deletes the leading and trailing end data in step 802 after dividing the full text data in step 801. However, it is also possible to detect the non-target data before dividing the full text data. Moreover, the leading and trailing end data may be directly generated without generating the word data 2 indicating the leading end and trailing end marks.

As mentioned in this embodiment, the cpu 13 does not delete the non-target data but deletes the leading and trailing end data, that is, the flag for the non-target data is OFF, so that only the non-target data is not hit solely but the non-target data sandwiched between words can be retrieved.

THIRD EMBODIMENT

The data retrieving apparatus according to a third embodiment has substantially the same structure as the second embodiment. The difference is that an affix segmentation data deleting program 108 is further provided. The cpu 13 executes the affix segmentation data deleting program 108 in the registering operation.

Figure 11:
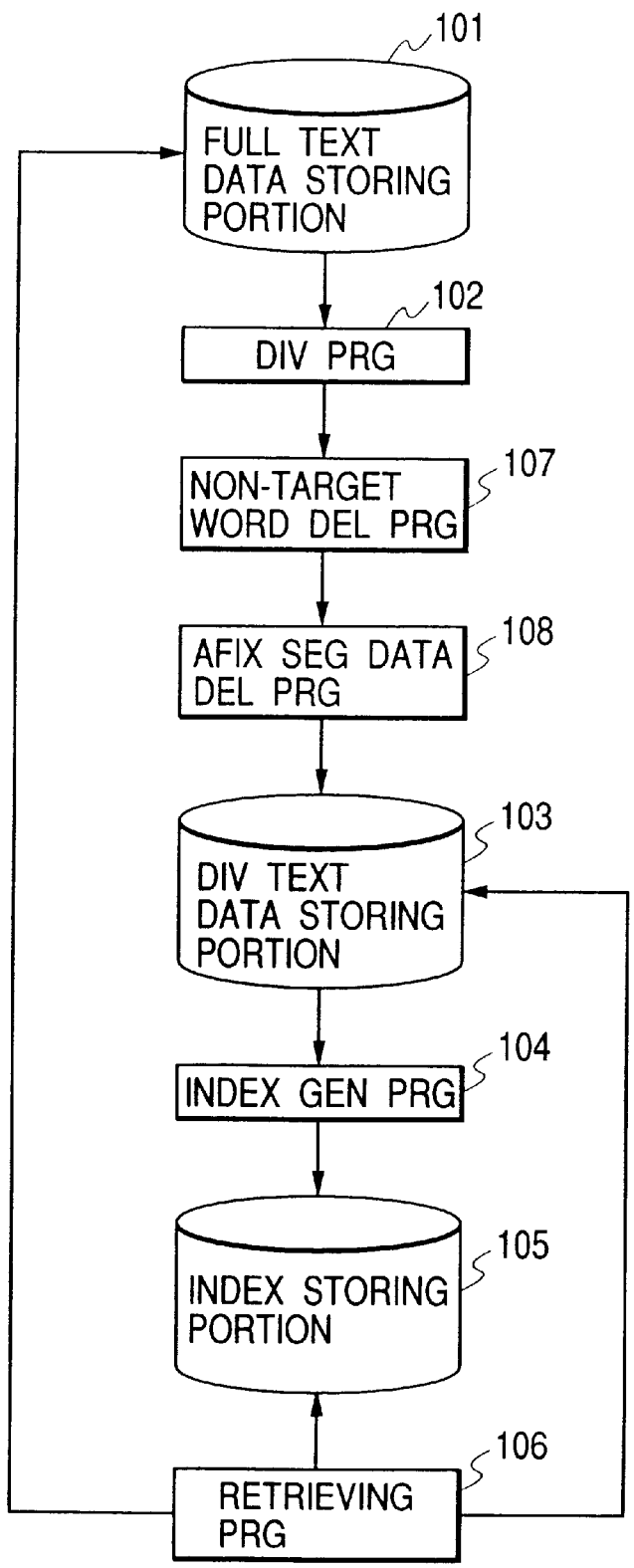
FIG. 11 is a functional block diagram of the data retrieving apparatus of the third embodiment.
Figure 12:
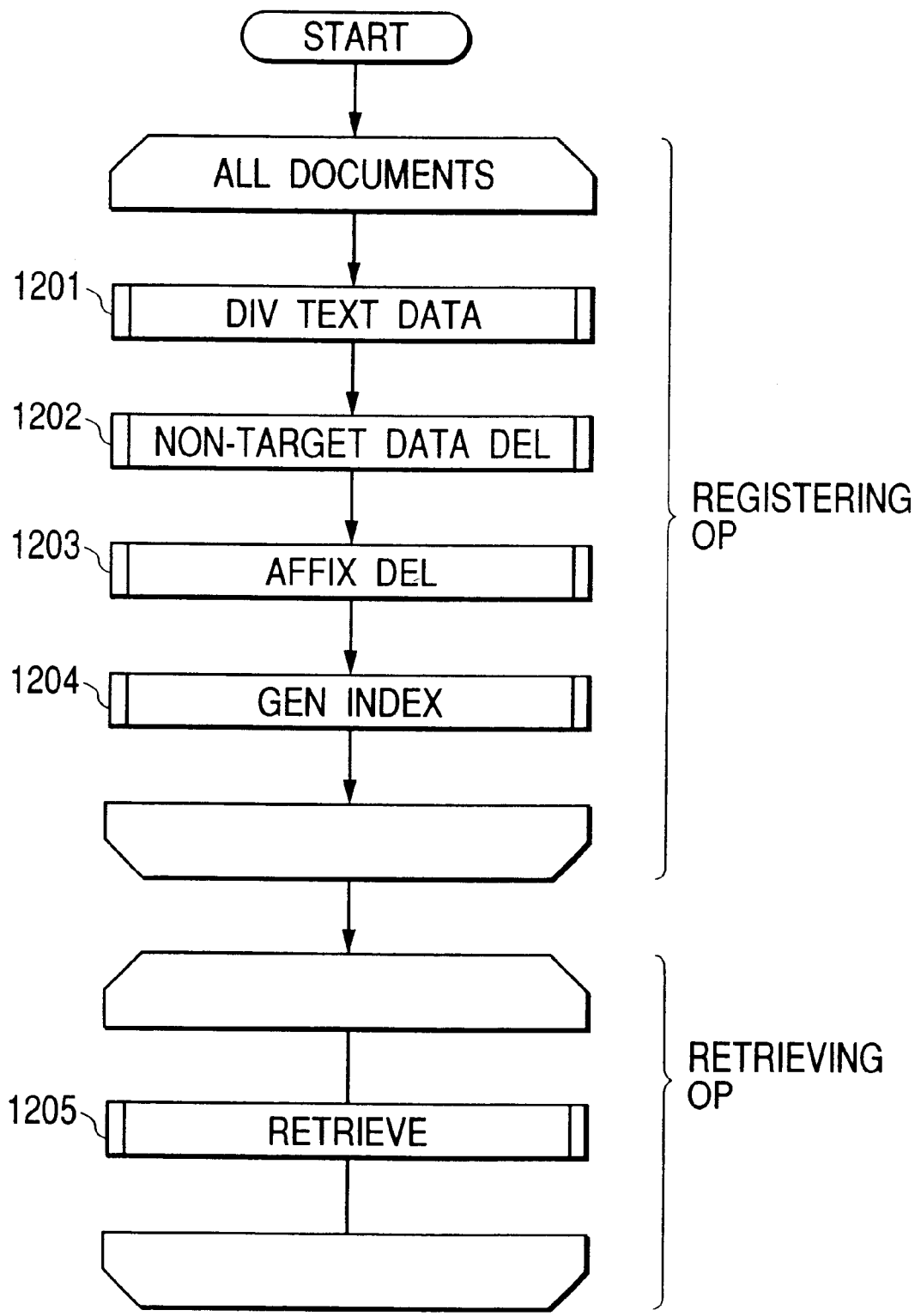
FIG. 12 depicts a flow chart of the third embodiment showing the operation of the data retrieving apparatus.

FIG. 11 is a functional block diagram of the data retrieving apparatus of the third embodiment. FIG. 12 depicts a flow chart of the third embodiment showing the operation of the data retrieving apparatus.

Figures 13A, 13B, 13C, 13D:
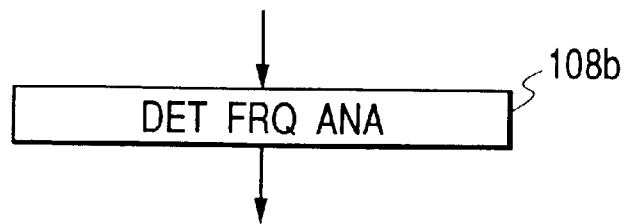
FIGS. 13A to 13C are illustrations of the third embodiment showing the index generation operation.
FIG. 13D is a step of the third embodiment showing frequency detection and analyzing operation.

FIGS. 13A and 13B are illustration of the third embodiment showing the index generation operation.

In this embodiment, one side of the segmentation data of affixes is deleted, so that noise hit in retrieving can be reduced.

After step 1202 of non-target word deletion processing, the cpu 13 executes an affix segmentation data deleting step 1203 with the affix segmentation data deleting program 108.

In step 1203, the cpu judges whether the word is an affix and whether the affix is a prefix or suffix. If the word is a prefix, the cpu 13 deletes the segmentation data after the word but the segmentation data before the word is left. On the other hand, if the word is a suffix, the cpu 13 deletes the segmentation data before the word but the segmentation data after the word is left.

If character string shown in FIG. 13A is registered, the text data is divided into word and non-target data is detected and the segmentation data of the non-target data is deleted as shown in FIG. 13B. Next, the cpu 13 detects affixes, that is, prefixes and suffixes as shown in FIG. 13B. The cpu 13 deletes the leading end data of suffixes and deletes the trailing end data of prefixes as shown in FIG. 13C. The registering operation of steps 1201 to 1204 is repeatedly effected for all full text data.

In the retrieving operation, the cpu 13 effects the operation mentioned in the third embodiment but the cpu 13 does not retrieve only suffix or only prefix, because one of segmentation data of the prefix and the suffix are deleted, so that noise in retrieving is reduced. On the other hand, it is possible to retrieve only the prefix or the suffix by the character string retrieving.

FIG. 13D is a step 108b of the third embodiment showing frequency detection and analyzing operation. This step is executed instep 1203.

The cpu 13 detects frequency of appearance of each word and analyzes the frequency of appearance of each word and determines that one word is an affix showing a frequency of appearance higher than a reference.

FIGS. 14A to 14D are illustration of the third embodiment showing the retrieving operation.

Figure 14A:
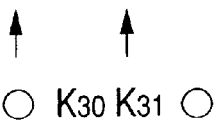
FIGS. 14A to 14D are illustrations of the third embodiment showing the retrieving operation.

If the query data is "$K_{30}K_{31}$", the character string "$K_{30}K_{31}$" in the full text data is hit in completion agreement mode as shown in FIG. 14A because there is leading end data before the character string "$K_{30}K_{31}$," in the index data and there is trailing end data after the character string "$K_{30}K_{31}$" in the index data, which agrees with that of the query data.

Figure 14B:

If the query data is "$K_{30}K_{31}K_{32}$", the character string "$K_{30}K_{31}K_{32}$" in the index data is hit in completion agreement mode as shown in FIG. 14B because there is leading end data before the character string "$K_{30}K_{31}K_{32}$" in the index data and there is trailing end data after the character string "$K_{30}K_{31}K_{32}$" in the index data, which agrees with that of the query data.

Figure 14C:
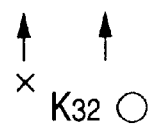

If the query data is "$K_{32}$", the character string "$K_{32}$" in the index data is not hit in completion agreement mode because there is no leading end data before the character string "$K_{32}$" in the index data but hit in the backward agreement or in the character string retrieving mode as shown in FIG. 14C.

Figure 14D:

If the query data is "$K_{31}K_{32}$", the character string $K_{31}K_{32}$" in the index data is not hit in completion agreement mode as shown in FIG. 14D because there is leading end data before the character string "$K_{31}K_{32}$" in the index data.

If the dividing program can recognize the affix, the number of steps can be reduced. The affix is detected in accordance with the word class data.

In the static analysing ward dividing, if boundary of one word is unclear, either of the leading end or the trailing end data is omitted, so that error in the word dividing operation can be absorbed in this operation, so that an accurate retrieving is provided.

As mentioned above, in this embodiment, the cpu 13 does not delete the word of an affix but either of the leading end data or the trailing end data. Thus, the affix is not hit solely. However, if a character string further includes an affix or does not include the affix, the character train can be accurately hit, so that noise in the word retrieving can be reduced.

Moreover, the size of the index data is the same as that of the first embodiment. However, the word retrieving is adaptively effected in the case that the character string includes an affix.

Moreover, if boundary of one word is unclear, either of the leading end or the trailing end data is omitted, so that error in the word dividing operation can be absorbed in this operation, so that an accurate retrieving is provided.

FOURTH EMBODIMENT

The data retrieving apparatus according to a fourth embodiment has substantially the same structure as the third embodiment. The difference is that a numerically evaluating program 110 and an ordering program 111 are further provided.

Figure 15:
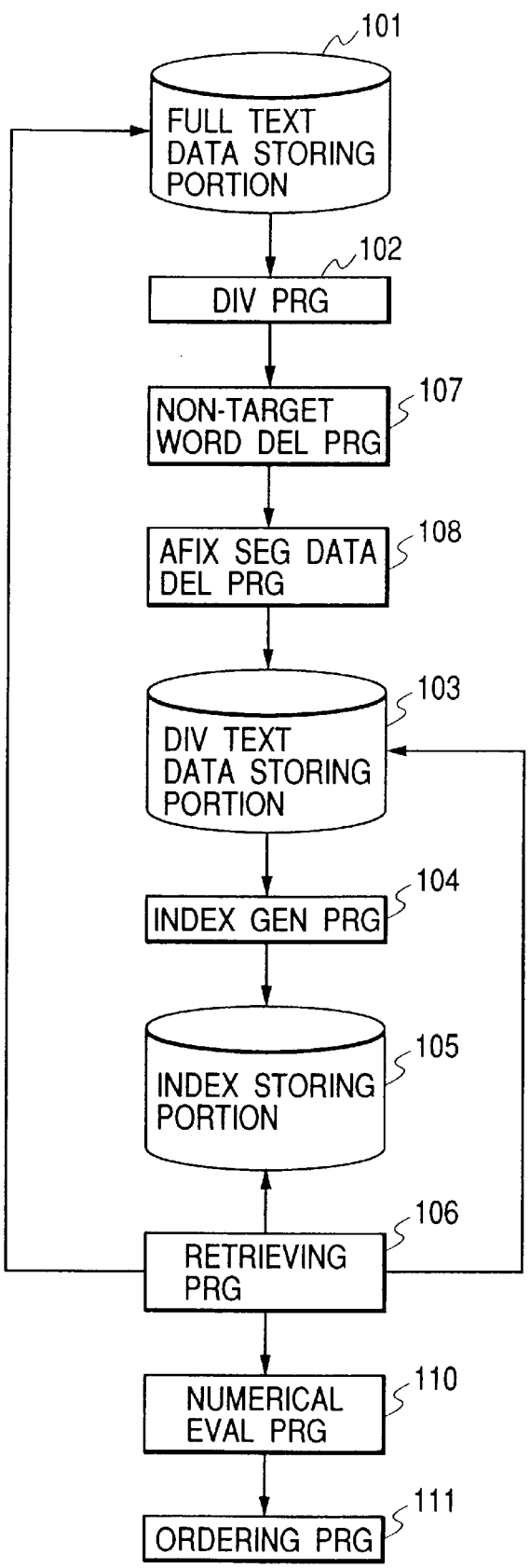
FIG. 15 is a functional block diagram of the data retrieving apparatus of the fourth embodiment.
Figure 16:
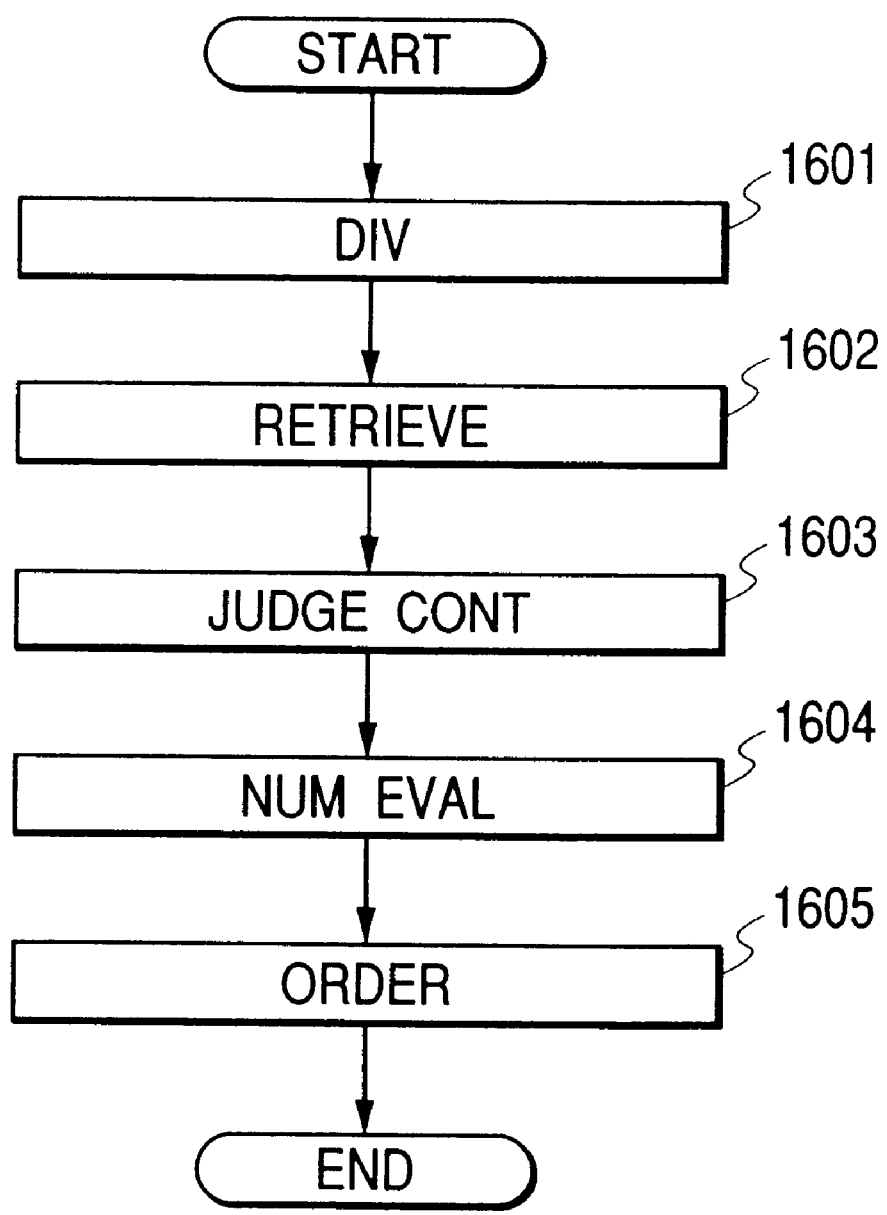
FIG. 16 depicts a flow chart of the fourth embodiment showing a data retrieving operation according to the fourth embodiment.

FIG. 15 is a functional block diagram of the data retrieving apparatus of the fourth embodiment. FIG. 16 depicts a flow chart of the fourth embodiment showing a data retrieving operation according to the fourth embodiment.

The cpu 13 executes the numerical evaluating operation in step 1604 with the numerically evaluating program 110 to numerically evaluates the result of retrieving. Moreover, the cpu 13 further executes the ordering program 111 to ordering sets of full text data in accordance with the numerically evaluated result.

The index data is provided as similar as the third embodiment. In FIG. 16, the cpu 13 executes retrieving operation. The cpu 13 divides the query data in step 1601, executes the index retrieving operation 1602, and judges the continuity in step 1603 for sets of full text data as similar as the first to third embodiments. After step 1603, the cpu 13 executes the numerical evaluating operation in step 1604 and ordering process 1605.

The cpu 13 judges that there is the completion agreement with the query data. If there is completion agreement in the word retrieving, the cpu 13 provides a point of x to a set of full text data, that is, a document. If there is character string agreement including no completion agreement, the document obtains a point of y. The cpu 13 calculates the final points every document in accordance one of predetermined methods.

In the following step 1605, the cpu 13 orders (arrangement) the sets of full text data, that is, the documents in accordance with the calculated final points of the documents and displays the result on the display 15.

There are various method of calculating the points. Hereinafter, three methods of calculation will be described.

First, the points x and y are provided in the condition x>y. For example, x=2 and y=1. If there are a plurality of character strings retrieved, the type of agreement showing the highest point is solely adopted. Thus, the document showing the completion agreement obtains a point of two and the document showing only the intermediate agreement obtains a point of one.

Figure 17A:
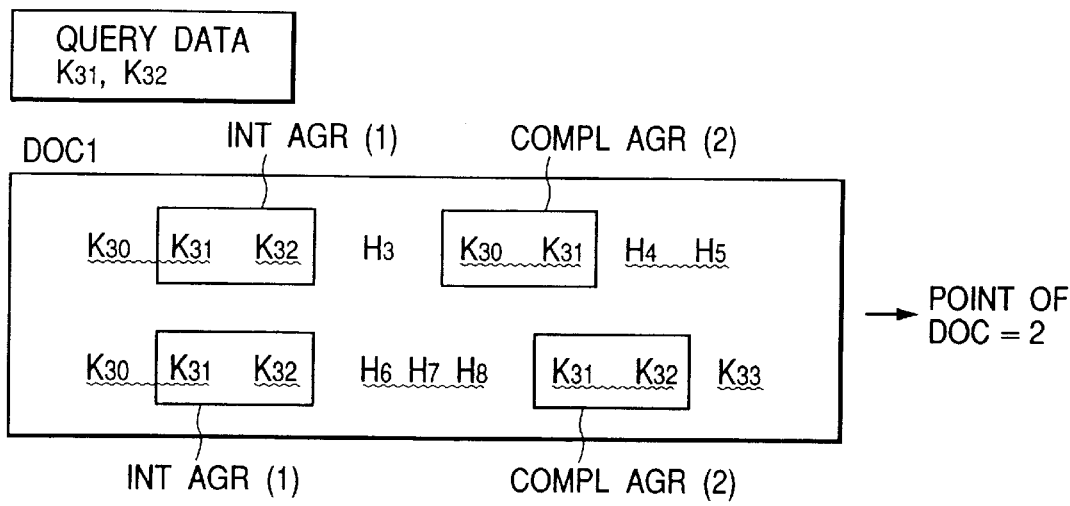
FIGS. 17A and 17B are illustrations of the fourth embodiment showing the calculation operation.
Figure 17B:
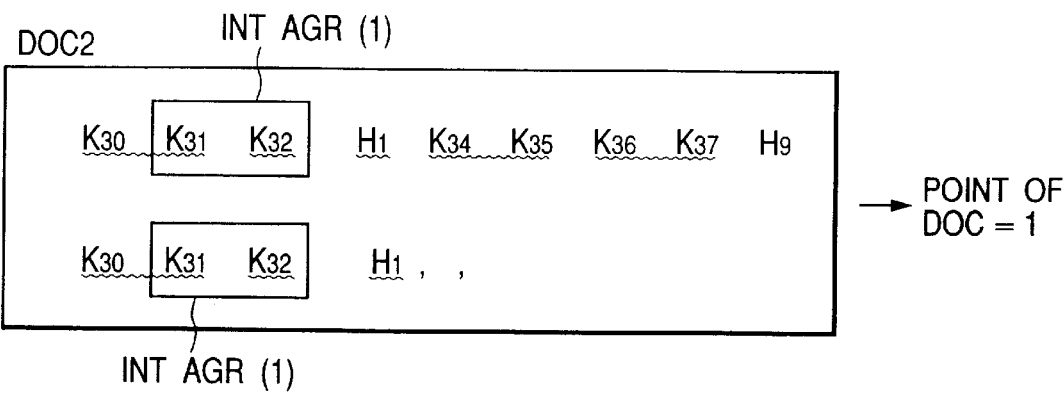

FIG. 17A and 17B are illustrations of the fourth embodiment showing the calculation operation.

In FIG. 17A, the word retrieving and the character string retrieving is effected with query data of "$K_{31}K_{32}$". There are two places showing the completion agreement and there are two place showing the intermediate agreement, that is, character agreement. In this case, one of the point of the completion is adopted. Thus, the document 1 obtains a point of two. On the other hand, there is only intermediate agreement, so that only one of the point of intermediate agreement is adopted. That is, the document 1 obtains a point of one.

Figure 18:
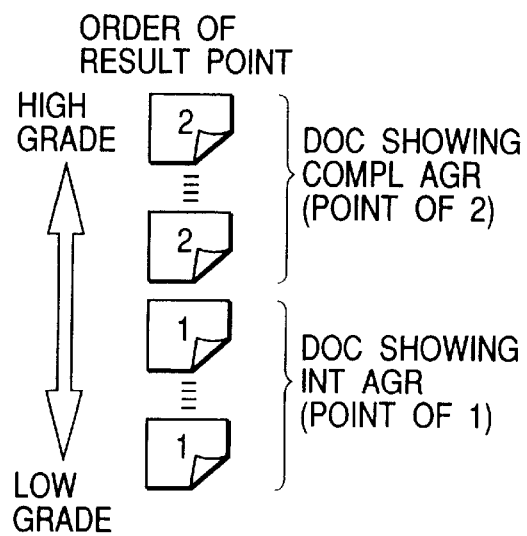
FIG. 18 is an illustrations of the fourth embodiment showing the calculation operation.

FIG. 18 is an illustrations of the fourth embodiment showing the calculation operation. At the high grade of the numerically evaluated retrieving result, documents showing the completion agreement are ranked. On the other hand, at a low grade, documents showing the intermediate agreement are ranked.

Generally, users desire to watch the result from the highest rank. Thus, the documents showing the completion agreement with retrieving noiseless are displayed with priority. On the other hand, the user can use the intermediate agreement to prevent leakage in retrieving.

In the second method, the numbers t of character strings retrieved in each document is obtained. It is assumed that the number exceeds the highest one of the numbers t is u. The value of x is a positive integer in the condition of x=uXy. Simply, x=u and y=1.

FIG. 19 is an illustration of the fourth embodiment showing an example of document for retrieving. FIG. 20 is an illustration of the fourth embodiment showing the point calculation operation and the ordering operation.

As shown in FIG. 19, the maximum value t of the number of hits is eight in the document 2. Then, the number 9 exceeding t=8 is determined and y=1.

The point of the document is a sum of the number of completion agreement hits Xx+the number of of intermediate agreement hits Xy. In FIG. 20, respective points are calculated assuming that x=9 and y=1.

The cpu 13 orders the documents in accordance with the points, that is, the documents are sorted in accordance with the points. There are two groups, namely, a completion agreement group and an intermediate agreement group on the both sides of the threshold value t. Documents in each group are sorted in accordance with the number of hits. It is general that the document showing the higher number of hits the likelihood document.

In this method, grouping is automatically provided every type of agreement in retrieving and documents in each group are further ordered in accordance with the number of hits.

In this example, the mode in the word retrieving is commanded and the documents are grouped into the group of completion agreement and the intermediate agreement including no completion agreement. However, it is also possible to provide more groups by changing the condition for providing points as follows:

point of intermediate agreement including no completion agreement, no forward agreement, no backward agreement y=1 point of the completion agreement x=uXuX uXuXy point of forward agreement v=uXuXy point of backward agreement w=uXy.

Thus, documents are classified into the completion agreement, the forward agreement, the backward agreement, and the intermediate agreement and are displayed in this order.

If one of modes other than the completion agreement in the word retrieving mode is commanded, the method of providing the points are changed such that the point in the completion agreement is reduced in comparison with other modes.

In the third method, the points are calculated in accordance with a ratio between the number of hit character strings in completion agreement and the number of character strings in the intermediate agreement. Alternatively, the points are calculated in accordance with a ratio between the number of documents showing the completion agreement and the number of documents showing the intermediate agreement.

It is assumed that the number of character strings showing the completion agreement is n and the number of character strings showing the intermediate agreement is m in a document. Since the intermediate agreement includes the completion agreement, the relation between n and m is given by:

$n \leq m$

Regarding the number of documents, the same relation is established.

FIG. 21A and 21B are illustrations of the fourth embodiment showing the relation between the completion agreement and the intermediate agreement.

In FIG. 21A, the ratio m/n is relative large. This condition is considered that the n character strings showing the completion agreement are different from the m character strings showing only the intermediate agreement, which is not resulted from error in the dividing the full text data into words. Thus, this result also reflects likelihood of the documents, so that this result is used in the calculation of the points.

On the other hand, in FIG. 21B, the ratio n/m is relatively low, i.e., near one. This condition is considered that there is an error in the dividing the full text data into words. Thus, this result also reflects likelihood of the documents, so that this result is used in the calculation of the points.

For example, it is assumed that the condition shown in FIG. 21A is provided with query data of "$K_{31}K_{32}$" (KYOUTO). This condition is considered that the character strings showing the intermediate agreement are different from the character strings showing the completion agreement. That is, in the completion agreement mode, character string "$K_{31}K_{32}$" (KYOUTO) can be retrieved. On the other hand, in the intermediate agreement mode, character strings "$K_{30}K_{31}K_{32}$" (TOUKYOUTO) are also retrieved. Thus, the number of intermediate agreements is relatively large, so that the ratio m/n becomes large.

On the other hand, it is assumed that the document is retrieved with query data of "$K_{40}k_{41}$" and the result is as shown in FIG. 21B. The character strings showing the intermediate agreement are considered to be the same as the character strings showing the completion agreement. For example, in the intermediate agreement, character string "$K_{40}k_{41}K_{42}$" may hit. The character "$K_{42}$" is a suffix of the character string "$K_{40}k_{41}$". However, if the suffix is not detected and it is judged that there is no word boundary between character strings "$K_{40}k_{41}$" and "$K_{42}$", such result will occur. Thus, this result is considered that there is an error in dividing the full text data into words.

To reflect such a ratio in calculating the points, ti is assumed that the number of character strings in a document is p and the number of character strings showing only the intermediate agreement is q and x and y are defined as similar as the second method and α is a constant. The point of a document is given by:

$pXxX\alpha X \, Log \, (m/n)+yXq$

Thus, the ratio m/n is reflected in the calculation of the point of a document.

The points x and y are determined as similar as the second method. That is, the number t of character strings retrieved in each document. The the maximum t is obtained. The value x exceeding the maximum t is determined and y=1.

Next, the documents are sorted in accordance with the points of the documents. Documents which are considered to be important are ranked at high positions and at low positions, documents which includes character strings which may not be retrieved in retrieving modes other than the intermediate agreement mode are ranked. In this method, group-separation in the ranking is unclear in comparison with the second method. However, the ranking reflects the accuracy in dividing the document into words.

As mentioned, only the ratio between the number of character strings showing the completion agreement and the number of character strings showing only the intermediate agreement is explained. However, ratios between the number of character stings in other modes are also used for calculating points.

FIG. 22 is an illustration of the fourth embodiment showing query data and operator. FIG. 23 depicts a portion of a flow chart of the fourth embodiment.

If sets of the query data are inputted and an operator indicating the logic operation between the sets of query data are inputted as shown in FIG. 22. A logic operation step 1606 is inserted between the step 1604 and 1605 in FIG. 16. Thus, the numerically evaluated results of respective query data is subjected to a logic operation and the result of the logic operation is supplied to the ordering step 1605 and the ordered documents are displayed.

The above-mentioned embodiments are explained in the case of Japanese. However, there are various languages similar to Japanese in written forms. That is, in many languages, particularly, languages in the asia area, there is no segmentation data between words in written forms. This invention is also applicable to these languages.

What is claimed is:

1. A method of retrieving first and second candidate data in full text data including no word separation data, comprising the steps of:

(a) dividing said full text data into words and thereby generating word separation data;

(b) generating and storing index data including the steps of:

(c) extracting all character strings from said full text data, each character string including N characters, N being a natural number; and (d) attaching said word separation data and character position data of each of said character strings to each of said character strings to generate said index data;

(e) inputting query data with segmentation indicative of leading and trailing ends of said query data;

(f) detecting agreement in word retrieving, said step (f) including steps of:

(g) collating said query data with each of said character strings in said index data to detect character agreement;

(h) collating said segmentation of said query data with said word separation data of each of said character strings to detect segmentation agreement;

(i) outputting said character position data of one of character strings showing said character agreement and said segmentation agreement; and (j) detecting agreement in character string retrieving, said step (j) including steps of:

(k) collating said query data with each of said N characters in said index data; and (l) outputting said character position data of one of said character strings showing only said character agreement, wherein either of said step (f) or step (j) is effected in accordance with a selection command and said index data is commonly used in the steps (f) and (j).

2. A method as claimed in claim 1, wherein said step (a) includes a step of:

generating said word separation data to have leading and trailing end data of each of said words and in step (h), said segmentation of said query data is compared with said leading and trailing end data of each character string, and in step (i), said position data of said first candidate data is outputted when said segmentation of said query data agrees with said leading and trailing end data of said one character string.

3. A method as claimed in claim 2, wherein said step (a) further includes step of: checking whether a first character having a first order in one of said character strings has leading and trailing ends;

attaching said leading end data to one of said character strings with respect to said first character when said first character has said leading end;

attaching said trailing end data to one of said character strings with respect to said first character when said first character has said trailing end;

checking whether a second character following said first character has a trailing end;

attaching said trailing end data to said one of said character strings with respect to said second character when said second character has said trailing end.

4. A method as claimed in claim 1, wherein both said steps (f) and (j) are effected in accordance with said selection command.

5. A method as claimed in claim 1, further comprising steps of:

dividing said query data into query character strings, each query character string includes N query characters, said step (g) being executed for said query character strings to obtain collating results of said query character strings, respectively;

estimating continuity of said character strings showing said character agreement with said query character strings in accordance with said position data of said character strings showing said character agreement, said step (h) being executed with respect to said word separation data just before the first character and said word separation data just after the last character of said character strings showing said character agreement and said continuity, wherein in step (i) said position data of said first candidate data is outputted when there is said continuity and said word separation data of the first and the last characters of said character strings agrees with said segmentation of said word separation data of the first and the last characters.

6. A method as claimed in claim 5, wherein said segmentation agreement is detected in either of first to fifth modes in response to a mode command, in said first mode, said segmentation agreement is established when said segmentation of the first and the last characters of said query data agrees with said word separation data just before the first character and said word separation data just after the last characters of said character string showing said character agreement;

in said second mode, said segmentation agreement is established when said segmentation of the first and the last characters of said query data agrees with said word separation data just before the first character and said word separation data just after the last characters of said character string showing said character agreement and when said segmentation of only the first character of said query data agrees with said word separation data just before the first character of said character string showing said character agreement;

in said third mode, said segmentation agreement is established when said segmentation of the first and the last characters of said query data agrees with said word separation data just before the first character and said word separation data just after the last characters of said character string showing said character agreement and when said segmentation of only the last character of said query data agrees with said word separation data just after the last character of said character string showing said character agreement;

in said fourth mode, said segmentation agreement is established when said segmentation of only the first character of said query data agrees with said word separation data just before the first character of said character string showing said character agreement; and in said fifth mode, said segmentation agreement is established when said segmentation of only the last character of said query data agrees with said word separation data just before the first character of said character string showing said character agreement.

7. A method as claimed in claim 1, further comprising the steps of:

detecting a condition of each word in said full text data; and judging whether each word is a non-target word in retrieving in accordance with said condition, wherein in said step (d), said word separation data is not attached to said one character string including said non-target word when one of said words is judged to be non-target word and said segmentation agreement is not effected when said word separation data is not attached to said one character string.

8. A method as claimed in claim 2, further comprising the steps of:

detecting a condition of each word in said full text data; and judging whether each word is a non-target word in retrieving in accordance with said condition, wherein in said step (d), said leading and trailing end data of said word separation data is not attached to said each character string when one of said words is judged to be a non-target word and said segmentation agreement is not detected when said word separation data is not attached to said one character string.

9. A method as claimed in claim 7, further comprising the steps of:
  detecting whether each of said words connects the previous one of said words to the following one of said words; and
  judging that one of said words is a non-target word when said one of words connects the previous one of said words to the following one of said words.

10. A method as claimed in claim 7, further comprising the steps of:
  detecting a word class of each word in said full text data to detect said condition, wherein one of words is judged to be said non-target word in accordance with said word class.

11. A method as claimed in claim 7, further comprising the steps of:
  detecting whether each of said words includes at least a hiragana character in said full text data to detect said condition, wherein one of said words is judged to be said non-target word when one of said words includes one hiragana character and when one of said words includes two hiragana characters.

12. A method as claimed in claim 7, further comprising the steps of:
  detecting a frequency of appearance of each word in said full text, wherein one of said words is judged to be said non-target word when one of said words has said frequency which is higher than a reference.

13. A method as claimed in claim 5, wherein said step (h) is not executed for intermediate word between said first character and the last character of said character strings showing said character agreement.

14. A method as claimed in claim 2, further comprising the steps of:
  detecting a prefix and a suffix of each word in said full text data, wherein said leading end data is not generated as said word separation data when the previous word of one of said words is prefix and said trailing end data is not generated as said word separation data when the following word of one of said words is suffix.

15. A method as claimed in claim 14, further comprising the steps of:
  detecting a word class of each word in said full text data to detect said prefix and said suffix.

16. A method as claimed in claim 14, further comprising the steps of:
  detecting a frequency of appearance of each word in said full text, wherein one of words is judged to be said prefix and suffix in accordance with said frequency.

17. A method as claimed in claim 1, further comprising steps of:
  numerically evaluating the results of said steps of (f) and (j), wherein said first and second candidate data is retrieved in sets of said full text data having document identification data, said method further comprising the steps of:
    ordering said sets of said full text data in accordance with the results of said steps of (f) and (j) of said sets of said full text data; and
    outputting said document identification data of said ordered full text data.

18. A method as claimed in claim 17, wherein said both steps of (f) and (j) are executed, said method further comprising the step of:
  weighting said results of said steps (f) and (j) with different first and second coefficients, respectively.

19. A method as claimed in claim 18, wherein said first and second coefficients are determined such that any set of said full text data having the lowest numerically evaluated result of said step (f) is ranked higher than any set of said full text data having the highest numerically evaluated result of said (j).

20. A method as claimed in claim 5, wherein said segmentation agreement is detected in either of first to third modes in response to a mode command,
  in said first mode, said segmentation agreement is established when said segmentation of the first and the last characters of said query data agrees with said word separation data of the first and the last characters of said character string showing said character agreement;
  in said second mode, said segmentation agreement is established when said segmentation of only the first character of said query data agrees with said word separation data of the first character of said character string showing said character agreement;
  in said third mode, said segmentation agreement is established when said segmentation of only the last character of said query data agrees with said word separation data of the last character of said character string showing said character agreement, said method further comprising steps of:
  weighting said results of said step (f) with first to third different coefficients in said first to third modes, respectively numerically evaluating the results of said steps of (f) and (j), wherein said first and second candidate data is retrieved in sets of said full text data having document identification data, said method further comprising the steps of:
  ordering said sets of said full text data in accordance with the results of said steps of (f) and (j) of said sets of said full text data; and
  outputting said document identification data of said ordered full text data.

21. A method as claimed in claim 20, further comprising the steps of:
  inputting ordering commands for ordering said first to third modes;
  generating said first to third coefficients in accordance with said ordering commands such that one of said first to third coefficients of which mode is the most highly ordered has a highest value, another of said first to third coefficients of which mode is the lowliest ordered has a lowest value, the other of said first to third coefficients of which mode is intermediately ordered has an intermediate value.

22. A method as claimed in claim 21, wherein said first and second candidate data is successively retrieved in each set of said full text data having document identification data, said method further comprising the steps of:
  classifying said sets of full text data into first to third groups such that said first group of said full text data includes said candidate data most highly ordered mode, said second group of said full text data includes said candidate data intermediately ordered mode but does not include said candidate data most highly ordered mode, and said third group of said full text data includes said candidate data lowliest ordered mode but does not include said candidate data most highly ordered and intermediately ordered modes;

ordering a first portion of said sets of said full text data in each of said first to third groups every said group in accordance with the number of pieces of said first candidate data retrieved in step (f) in respective full text data of said first portion; and ordering a second portion of said sets of said full text data in which only said second candidate data is retrieved in step (j) in accordance with the number pieces of said second candidate data.

23. A method as claimed in claim 20, further comprising the steps of:

detecting ratios between the number of said first candidate data and said second candidate data in said sets of full text data, respectively;

estimating accuracies of said sets of said full text data in operation in step (a) in accordance with said ratio, respectively, wherein said sets of full text data is ordered in accordance with said accuracies, respectively.

24. A method as claimed in claim 17, wherein in said step (e), said query data including a plurality of quarry character strings and at least an operator indicating operation among a plurality of query character strings are inputted, wherein in said step of ordering, said each of full text data is ordered in accordance with each of said query character strings, said method further comprising the step of: finally ordering said sets of said full text data in accordance with the ordering result of said sets of said full text data and said operator.

25. A data retrieving apparatus for retrieving first and second candidate data in full text data including no word separation data, comprising:

dividing means for dividing said full text data into words and thereby generating word separation data;

generation and storing means for generating and storing index data including:

extracting means for extracting all character strings from said full text data, each character string including N characters, N being a natural number; and attaching means for attaching said word separation data and character position data of each of said character strings to each of said character strings to generate said index data;

inputting means for inputting query data with segmentation indicative of leading and trailing ends of said query data;

first detecting means for detecting agreement in word retrieving including:

first collating means for collating said query data with each of said character strings in said index data to detect character agreement;

second collating means for collating said segmentation of said query data with said word separation data of each of said character strings to detect segmentation agreement;

first outputting means for outputting said character position data of one of character strings showing said character agreement and said segmentation agreement; and second detecting means for detecting agreement in character string retrieving including:

third collating means for collating said query data with each of said N characters in said index data; and second outputting means for outputting said character position data of one of said character strings showing only said character agreement, wherein either of said first detecting means or said second detecting means is operated in accordance with a selection command and said index data is commonly used in said first and second detecting means.

26. A data retrieving apparatus as claimed in claim 25, wherein said dividing means includes generating means for generating said word separation data to have leading and trailing end data of each of said words and said second collating means compares said segmentation of said query data with said leading and trailing end data of each character string, and said position data of said first candidate data is outputted by said first outputting means when said segmentation of said query data agrees with said leading and trailing end data of said one of character strings.

27. A data retrieving apparatus as claimed in claim 26, wherein said dividing means further includes: first checking means for checking whether a first character having a first order in one of said character strings has leading and trailing ends; first attaching means for attaching said leading end data to one of said character strings with respect to said first character when said first character has said leading end; second attaching means for attaching said trailing end data to one of said character strings with respect to said first character when said first character has said trailing end; second checking means for checking whether a second character following said first character has a trailing end; third attaching means for attaching said trailing end data to said one of said character strings with respect to said second character when said second character has said trailing end.

28. A data retrieving apparatus as claimed in claim 25, wherein both said first and second detecting means are operated in accordance with said selection command.

29. A data retrieving apparatus as claimed in claim 25, further comprising:

query data dividing means for dividing said query data into query character strings, each query character string includes N query characters, said first collating means being operated for said query character strings to obtain collating results of said query character strings, respectively;

estimating means for estimating continuity of said character strings showing said character agreement with said query character strings in accordance with said position data of said character strings showing said character agreement, said second collating means being executed with respect to said word separation data just before the first character and said word separation data just after the last character of said character strings showing said character agreement and said continuity, wherein said position data of said first candidate data is outputted by said first outputting means when there is said continuity and said word separation data of the first and the last characters of said character strings agrees with said segmentation of said word separation data of the first and the last characters.

30. A data retrieving apparatus as claimed in claim 29, wherein said segmentation agreement is detected in either of first to fifth modes in response to a mode command, in said first mode, said segmentation agreement is established when said segmentation of the first and the last characters of said query data agrees with said word separation data just before the first character and said word separation data just after the last characters of said character string showing said character agreement, respectively;

in said second mode, said segmentation agreement is established when said segmentation of the first and the last characters of said query data agrees with said word separation data just before the first character and said word separation data just after the last characters of said character string showing said character agreement, respectively, and when said segmentation of only the first character of said query data agrees with said word separation data just before the first character of said character string showing said character agreement;

in said third mode, said segmentation agreement is established when said segmentation of the first and the last characters of said query data agrees with said word separation data just before the first character and said word separation data just after the last characters of said character string showing said character agreement, respectively and when said segmentation of only the last character of said query data agrees with said word separation data just after the last character of said character string showing said character agreement;

in said fourth mode, said segmentation agreement is established when said segmentation of only the first character of said query data agrees with said word separation data just before the first character of said character string showing said character agreement; and in said fifth mode, said segmentation agreement is established when said segmentation of only the last character of said query data agrees with said word separation data just before the first character of said character string showing said character agreement.

31. A data retrieving apparatus as claimed in claim 30, further comprising:
   detecting means for detecting a condition of each word in said full text data; and
   judging means for judging whether each word is a non-target word in retrieving in accordance with said condition, wherein said attaching means attaches said word separation data to one of said character strings including said non-target word when one of said words is judged as a non-target word and said segmentation agreement is not effected when said word separation data is not attached to said one of character strings.

32. A data retrieving apparatus as claimed in claim 25, further comprising:
   third detecting means for detecting a condition of each word in said full text data; and
   judging means for judging whether each word is a non-target word.in retrieving in accordance with said condition, wherein said attaching means does not attach said leading and trailing end data of said word separation data to said each character string when one of said words is judged as a non-target word and said segmentation agreement is not detected when said word separation data is not attached to said one of said character strings.

33. A data retrieving apparatus as claimed in claim 26, further comprising:
   third detecting means for detecting a prefix and a suffix of each word in said full text data, wherein said leading end data is not generated as said word separation data when the previous word of one of said words is prefix and said trailing end data is not generated as said word separation data when the following word of one of said words is suffix.

34. A data retrieving apparatus as claimed in claim 26, further comprising:
   third detecting means for detecting a word class of each word in said full text data to detect said prefix and said suffix.

35. A data retrieving apparatus as claimed in claim 25, further comprising:
   evaluating means for numerically evaluating the results of said first and second detecting means, wherein said first and second candidate data is retrieved in sets of said full text data having document identification data, said method further comprising:
   ordering means for ordering said sets of said full text data in accordance with the results of said first and second detecting means of said sets of said full text data; and
   third outputting means for outputting said document identification data of said ordered full text data.

36. A data retrieving apparatus as claimed in claim 35, wherein said first and second coefficients are determined such that any set of said full text data having the lowest numerically evaluated result of said first detecting means is ranked higher than any set of said full text data having the highest numerically evaluated result of said second detecting means.

37. A data retrieving apparatus claimed in claim 35, wherein said segmentation agreement is detected in either of first to third modes in response to a mode command,
   in said first mode, said segmentation agreement is established when said segmentation of the first and the last characters of said query data agrees with said word separation data of the first and the last characters of said character string showing said character agreement;
   in said second mode, said segmentation agreement is established when said segmentation of only the first character of said query data agrees with said word separation data of the first character of said character string showing said character agreement;
   in said third mode, said segmentation agreement is established when said segmentation of only the last character of said query data agrees with said word separation data of the last character of said character string showing said character agreement, said data retrieving apparatus further comprising: weighting means for weighting said results of said first detecting means with first to third different coefficients in said first to third modes, respectively, evaluating means for numerically evaluating the results of said first and second detecting means, wherein said first and second candidate data is retrieved in sets of said full text data having document identification data, said data retrieving means further comprising:
   ordering means for ordering said sets of said full text data in accordance with the results of said first and second detecting means of said sets of said full text data; and
   third outputting means for outputting said document identification data of said ordered full text data.

38. A data retrieving apparatus as claimed in claim 37, further comprising:
   inputting means for inputting ordering commands for ordering said first to third modes;
   generating means for generating said first to third coefficients in accordance with said ordering commands such that one of said first to third coefficients of which mode is the most highly ordered has a highest value, another of said first to third coefficients of which mode is the lowliest ordered has a lowest value, and the other of said first to third coefficients of which mode is intermediately ordered has an intermediate value.

39. A data retrieving apparatus as claimed in claim 38, wherein said first and second candidate data is successively retrieved in each set of said full text data having document identification data, said data retrieving apparatus further comprising:

classifying means for classifying said sets of full text data into first to third groups such that said first group of said full text data includes said candidate data most highly ordered mode, said second group of said full text data includes said candidate data intermediately ordered mode but does not include said candidate data most highly ordered mode, and said third group of said full text data includes said candidate data lowliest ordered mode but does not include said candidate data most highly ordered and intermediately ordered modes;

first ordering means for ordering a first portion of said sets of said full text data in each of said first to third groups every said group in accordance with the number of pieces of said first candidate data retrieved by first detecting means in respective full text data of said first portion; and second ordering means for ordering a second portion of said sets of said full text data in which only said second candidate data is retrieved by said second detecting means in accordance with the number pieces of said second candidate data.

40. A data retrieving apparatus as claimed in claim 35, further comprising:

third detecting means for detecting ratios between the number of said first candidate data and said second candidate data in said sets of full text data, respectively; and estimating means for estimating accuracies of said sets of said full text data in operation by said dividing means in accordance with said ratio, respectively, wherein said sets of full text data is ordered in accordance with said accuracies, respectively.

* * * * *